US011331793B2

(12) United States Patent
Moriya et al.

(10) Patent No.: US 11,331,793 B2
(45) Date of Patent: May 17, 2022

(54) DEVICE FOR OUTPUTTING HOLDING DETECTION RESULTS

(71) Applicant: OMRON CORPORATION, Kyoto (JP)

(72) Inventors: Toshihiro Moriya, Tokyo (JP); Yumi Tsutsumi, Yawata (JP); Masayoshi Abe, Kyoto (JP); Haruna Shimakawa, Kyoto (JP); Chisato Saito, Tokyo (JP); Yukihisa Karako, Soraku-gun (JP)

(73) Assignee: OMRON Corporation, Kyoto (JP)

( * ) Notice: Subject to any disclaimer, the term of this patent is extended or adjusted under 35 U.S.C. 154(b) by 425 days.

(21) Appl. No.: 16/347,846

(22) PCT Filed: Mar. 9, 2017

(86) PCT No.: PCT/JP2017/009506
§ 371 (c)(1),
(2) Date: May 7, 2019

(87) PCT Pub. No.: WO2018/123086
PCT Pub. Date: Jul. 5, 2018

(65) Prior Publication Data
US 2019/0315578 A1 Oct. 17, 2019

(30) Foreign Application Priority Data
Dec. 28, 2016 (JP) .............................. JP2016-255663

(51) Int. Cl.
B25J 9/16 (2006.01)
B25J 15/06 (2006.01)
(Continued)

(52) U.S. Cl.
CPC ............ B25J 9/1605 (2013.01); G05B 19/19 (2013.01); G05B 19/402 (2013.01);
(Continued)

(58) Field of Classification Search
CPC .................................. B25J 9/16; B25J 15/06
See application file for complete search history.

(56) References Cited

U.S. PATENT DOCUMENTS 9,393,693 B1    7/2016  Kalakrishnan et al.
9,569,568 B2 *  2/2017  Kimoto ................. B25J 9/1671
                        (Continued)

FOREIGN PATENT DOCUMENTS

CN    101081512 A    12/2007
CN    101518901 A     9/2009
                    (Continued)

OTHER PUBLICATIONS

Hirohiko Arai et al., "Handling of Flat Object by Non-contact Suction Hand : Planning of Handling Trajectory for Suppressing Sideslip", JSME Conference on Robotics and Mechatronics conference 2013 digest, The Japan Society of Mechanical Engineers, May 22-25, 2013, 1A1-K02, Particularly, 1. Introduction, Relevance is indicated in the (translated) ISR dated May 30, 2017.
(Continued)

Primary Examiner — Kira Nguyen
(74) Attorney, Agent, or Firm — Metrolex IP Law Group, PLLC

(57) ABSTRACT

The purpose of the present invention is to provide a device for outputting holding detection results by a highly accurate simulation in consideration of parameters related to a holding member. A user enters workpiece information through an input UI unit. A selection control unit executes an automatic selection process of a suction pad based on the workpiece information input through the input UI unit, an automatic selection process of a workpiece physical model, an automatic selection process of a robot, and a confirmation process of a vibration tolerance, and then displays the selection results. The selection control unit determines (Continued)

whether there is a problem with the selection results based on an input instruction from the user.

11 Claims, 38 Drawing Sheets

(51) Int. Cl.
| | |
|---|---|
| *G05B 19/19* | (2006.01) |
| *G05B 19/425* | (2006.01) |
| *G05B 19/402* | (2006.01) |
| *H04N 13/167* | (2018.01) |
| *G06T 7/70* | (2017.01) |
| *G06T 7/73* | (2017.01) |
| *G06V 10/40* | (2022.01) |
| *B65G 47/91* | (2006.01) |

(52) U.S. Cl.
CPC ............. *G05B 19/425* (2013.01); *G06T 7/70* (2017.01); *G06T 7/75* (2017.01); *G06V 10/40* (2022.01); *H04N 13/167* (2018.05); *B65G 47/917* (2013.01); *G05B 2219/39391* (2013.01); *G05B 2219/39543* (2013.01); *G05B 2219/39558* (2013.01)

(56) References Cited

U.S. PATENT DOCUMENTS

| | | | |
|---|---|---|---|
| 9,910,761 B1* | 3/2018 | Jules | .................... G06F 11/3664 |
| 10,105,847 B1* | 10/2018 | Latimer | ................. B25J 9/1605 |
| 2004/0199434 A1* | 10/2004 | Tanaka | ................. G06Q 10/087 |
| | | | 705/27.1 |
| 2007/0274812 A1 | 11/2007 | Ban et al. | |
| 2009/0216378 A1 | 8/2009 | Murayama | |
| 2011/0166704 A1 | 7/2011 | Hashimoto | |
| 2012/0265498 A1 | 10/2012 | Choi et al. | |
| 2013/0125319 A1* | 5/2013 | Regan | .................... A43D 63/00 |
| | | | 12/142 R |
| 2013/0211593 A1 | 8/2013 | Domae et al. | |
| 2014/0081431 A1 | 3/2014 | Nakata et al. | |
| 2015/0197009 A1 | 7/2015 | Melikian | |
| 2015/0258689 A1 | 9/2015 | Suzuki | |
| 2016/0199981 A1* | 7/2016 | Atohira | .................. B25J 9/1605 |
| | | | 700/248 |
| 2016/0221187 A1 | 8/2016 | Bradski et al. | |
| 2017/0140521 A1* | 5/2017 | Sakaguchi | ......... G06K 9/00335 |

FOREIGN PATENT DOCUMENTS

| | | |
|---|---|---|
| CN | 103221188 A | 7/2013 |
| CN | 104908051 A | 9/2015 |
| DE | 102011084353 A1 | 4/2013 |
| EP | 2708335 A1 | 3/2014 |
| EP | 3563985 A1 | 11/2019 |
| JP | H07-256578 A | 10/1995 |
| JP | H10-161730 A | 6/1998 |
| JP | H10-260713 A | 9/1998 |
| JP | H11-33955 A | 2/1999 |
| JP | 2013-512522 A | 4/2013 |
| JP | 2014-211361 A | 11/2014 |
| JP | 2015-100866 A | 6/2015 |
| JP | 2015100866 A * | 6/2015 |
| JP | 6646894 B2 | 2/2020 |
| WO | 2003/038688 A1 | 5/2003 |
| WO | 2013/014961 A1 | 1/2013 |
| WO | 2015/178377 A1 | 11/2015 |

OTHER PUBLICATIONS

An English translation of the International Search Report of PCT/JP2017/009506 dated May 30, 2017.

The Office Action dated Aug. 27, 2021 in a counterpart Chinese patent application, with English translation.

* cited by examiner

| INPUT OF CONDITIONS | | |
|---|---|---|
| VARIATION IN WORKPIECE HEIGHT | UNIFORM ▽ | —C1 |
| ALLOWANCE OF SUCTION MARK ON WORKPIECE | ALLOWED ▽ | —C2 |
| ROUGHNESS OF WORKPIECE SURFACE | ROUGH ▽ | —C3 |
| MASS OF WORKPIECE | 1 kg | —C4 |
| AIR RESISTANCE OF WORKPIECE | SMALL ▽ | —C5 |
| SIZE OF SUCTION PART OF WORKPIECE | VERTICAL 4 cm HORIZONTAL 8 cm | } C6 |
| CONTENTS OF WORKPIECE | NONE ▽ ☐ FOOD | C7, C8 |
| ATMOSPHERIC PRESSURE  C9 | 0.9 kPa | AUTOMATIC ACQUISITION |
| SUCTION PRESSURE  C10 | 60 kPa | |
| VIBRATION TOLERANCE DURING CONVEYANCE  C11 | 1.0 cm | PREVIEW |
| VIBRATION TOLERANCE UPON PLACEMENT  C12 | 1.0 cm | PREVIEW |
| | AUTOMATIC SELECTION | CANCEL |

G1

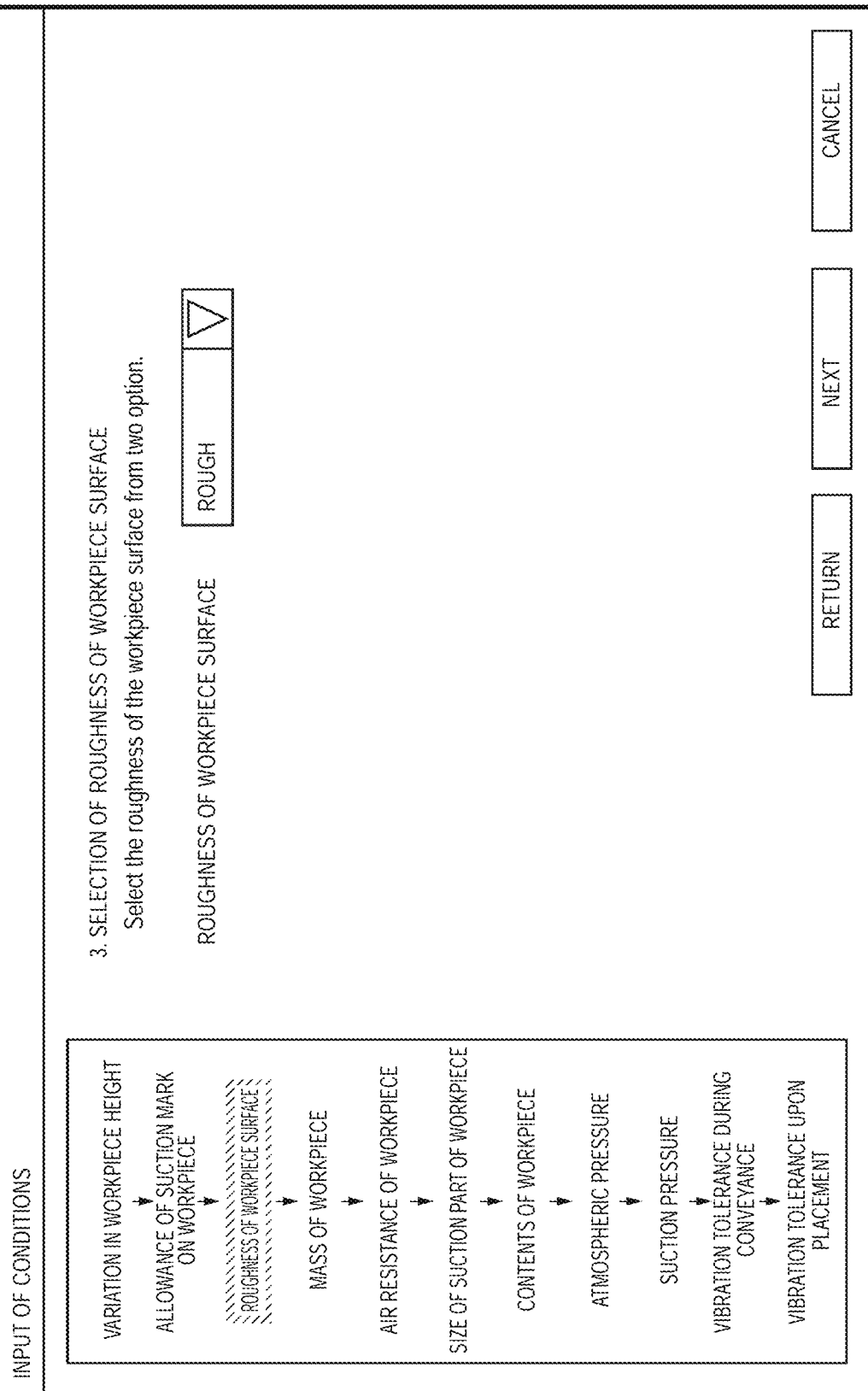

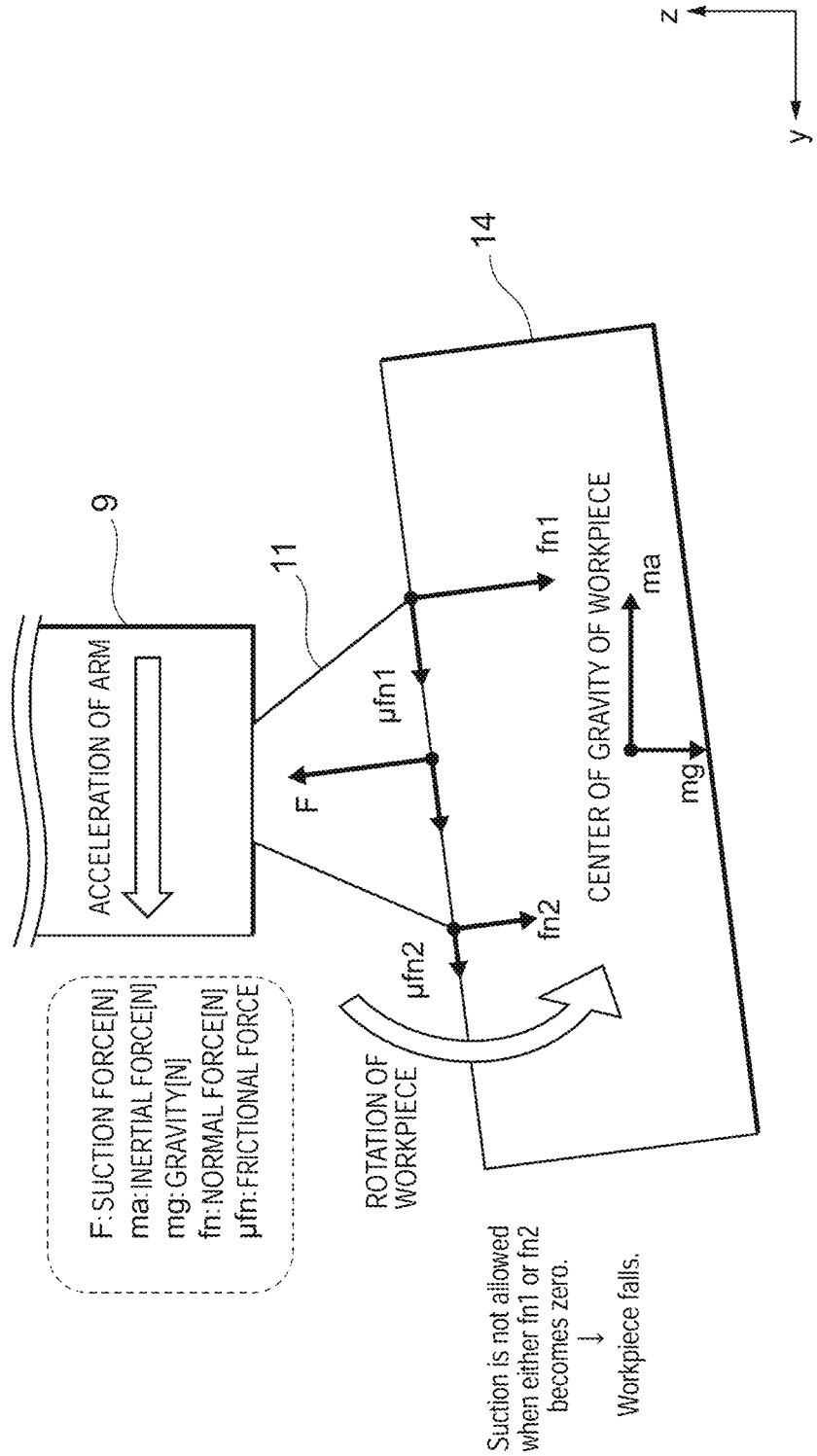

FIG. 17
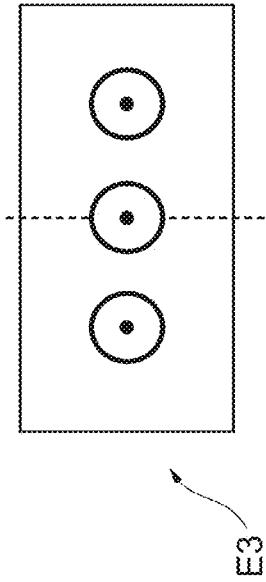
<EXAMPLE 3. IN CASE OF NUMBER OF SUCTION PADS = 3 (ODD NUMBER)>
E3
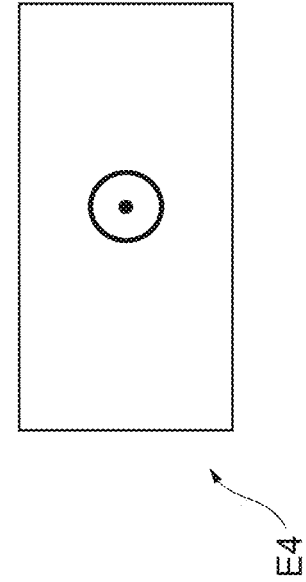
<EXAMPLE 4. IN CASE OF NUMBER OF SUCTION PADS = 1 (ODD NUMBER)>
E4
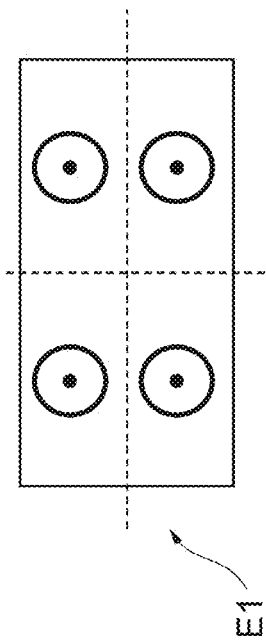
<EXAMPLE 1. IN CASE OF NUMBER OF SUCTION PADS = 4 (EVEN NUMBER)>
E1
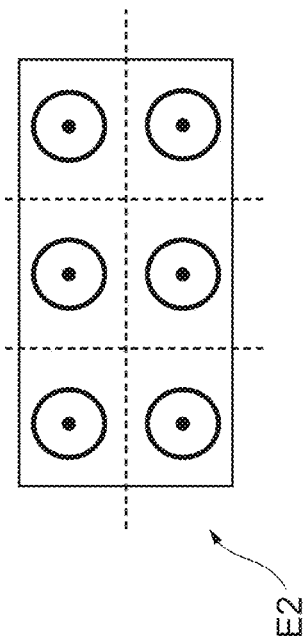
<EXAMPLE 2. IN CASE OF NUMBER OF SUCTION PADS = 6 (EVEN NUMBER)>
E2

| ID | UNIVERSAL PRODUCT CODE | NAME | IMAGE DIAGRAM | CATEGORY | CATEGORY | VARIATION IN HEIGHT | ALLOWANCE OF SUCTION MARK | ... | CONTENTS | FOOD? |
|---|---|---|---|---|---|---|---|---|---|---|
| 1 | 4901660103451 | Cx-1003 |  | CAPACITOR | X ELECTRONICS | UNIFORM | ALLOWED | ... | NONE | FALSE |
| 2 | 4901560103251 | Cycy-132 |  | CAPACITOR | Y MANUFACTURING COMPANY | UNIFORM | ALLOWED | ... | NONE | FALSE |
| ... | ... | | ... | ... | ... | ... | ... | ... | ... | ... |
| 15 | 4903660103451 | Tk-3333 |  | SWEETS | Z FOODS | UNIFORM | NOT ALLOWED | ... | SOLID | TRUE |
| ... | ... | | ... | ... | ... | ... | ... | ... | ... | ... |

←—— INFORMATION FOR RETRIEVAL ——→ ←—— AUTOMATIC INPUT WORKPIECE INFORMATION ——→

220

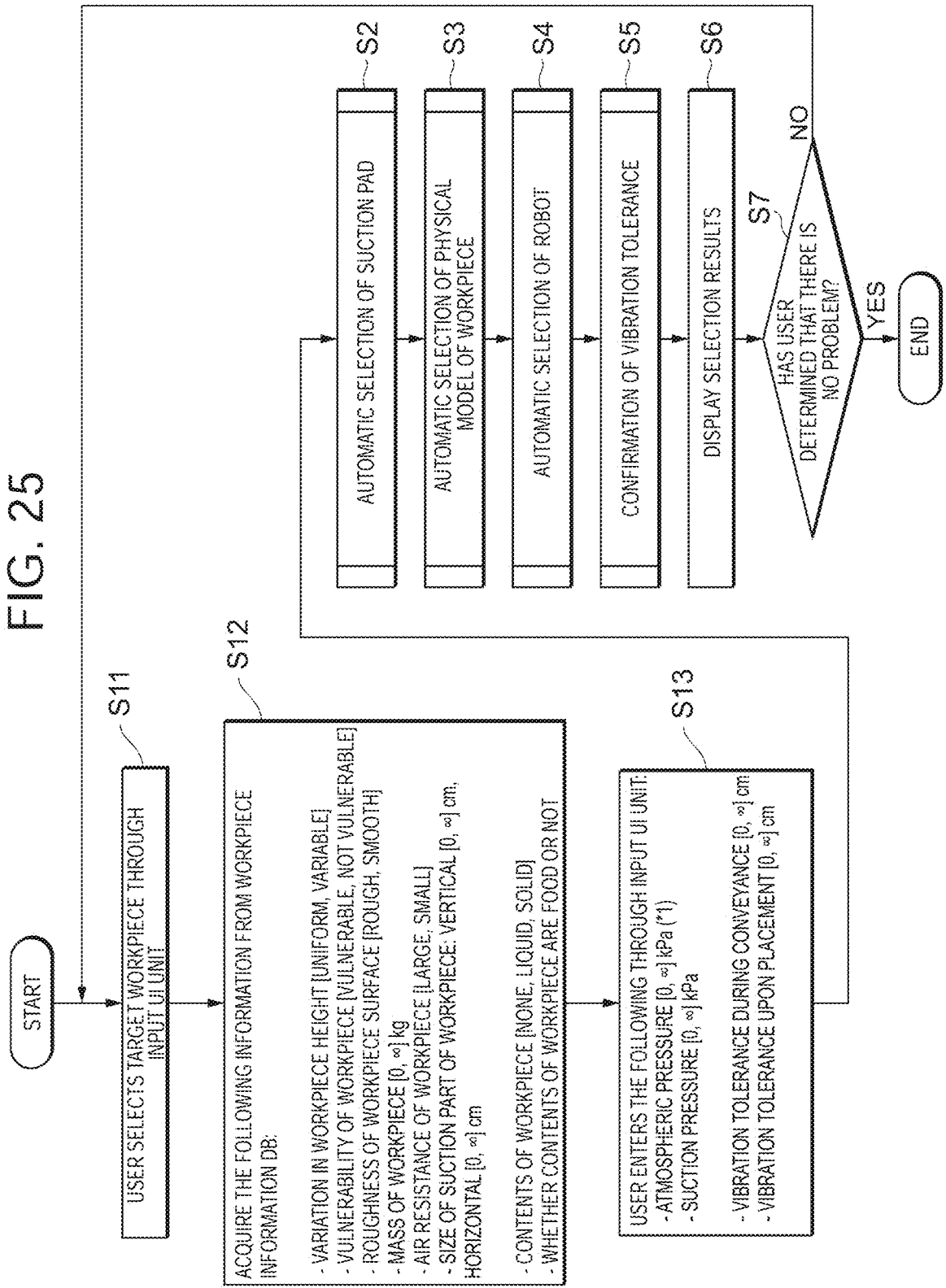

FIG. 26

| SELECTION OF WORKPIECE | | | | | | |
|---|---|---|---|---|---|---|
| ID ▽ | UNIVERSAL PRODUCT CODE ▽ | NAME ▽ | IMAGE DIAGRAM ▽ | CATEGORY ▽ *CAPACITOR | MANUFACTURER ▽ | |
| 1 | 4901660103451 | Ox-1003 | | CAPACITOR | X ELECTRONICS | |
| 2 | 4901560103251 | Cycy-132 | | CAPACITOR | Y MANUFACTURING COMPANY | |
| 151 | 4901560103251 | ewaw-1232 | | ELECTROLYTIC CAPACITOR | Y MANUFACTURING COMPANY | |
| 211 | 4901560103251 | defe-1002 | | ELECTROLYTIC CAPACITOR | X ELECTRONICS | |

OK    CANCEL

AUTOMATIC INPUT WORKPIECE INFORMATION

G1'

| INPUT OF CONDITIONS | | |
|---|---|---|
| VARIATION IN WORKPIECE HEIGHT | UNIFORM ▽ | |
| ALLOWANCE OF SUCTION MARK ON WORKPIECE | ALLOWED ▽ | |
| ROUGHNESS OF WORKPIECE SURFACE | SMOOTH ▽ | |
| MASS OF WORKPIECE | 0.00000011 | kg |
| AIR RESISTANCE OF WORKPIECE | SMALL ▽ | |
| SIZE OF SUCTION PART OF WORKPIECE VERTICAL | 1 cm HORIZONTAL 1 | cm |
| CONTENTS OF WORKPIECE | NONE ▽ | ☐ FOOD |
| ATMOSPHERIC PRESSURE | 0.9 | kPa | AUTOMATIC ACQUISITION |
| SUCTION PRESSURE | 60 | kPa | |
| VIBRATION TOLERANCE DURING CONVEYANCE | 1.0 | cm | PREVIEW |
| VIBRATION TOLERANCE UPON PLACEMENT | 1.0 | cm | PREVIEW |
| | | | AUTOMATIC SELECTION  CANCEL |

MANUAL INPUT WORKPIECE INFORMATION

FIG. 37

```
┌─────────────────────────────────────────────────────────────────┐
│ INPUT OF CONDITIONS                                             │
│                                                                 │
│   VARIATION IN WORKPIECE HEIGHT       UNIFORM       ▽           │
│                                                                 │
│   ALLOWANCE OF SUCTION MARK ON WORKPIECE  ALLOWED   ▽           │
│                                                                 │
│   ROUGHNESS OF WORKPIECE SURFACE      SMOOTH        ▽           │
│                                                                 │
│   MASS OF WORKPIECE                   0.00000011    kg          │
│                                                                 │
│   AIR RESISTANCE OF WORKPIECE         SMALL         ▽           │
│                                                                 │
│   SIZE OF SUCTION PART OF WORKPIECE   VERTICAL 1 cm HORIZONTAL 1 cm │
│                                                                 │
│   CONTENTS OF WORKPIECE               NONE    ▽    ☐ FOOD       │
│                                                                 │
│   ATMOSPHERIC PRESSURE                0.9     kPa   [ FOOD ]    │
│                                                                 │
│   SUCTION PRESSURE                    60      kPa               │
│                                                                 │
│   VIBRATION TOLERANCE DURING CONVEYANCE  1.0  cm  [AUTOMATIC ACQUISITION] │
│                                                                 │
│   VIBRATION TOLERANCE UPON PLACEMENT     1.0  cm  [   PREVIEW  ]│
│                                                                 │
│                              [AUTOMATIC SELECTION]  [  CANCEL  ]│
└─────────────────────────────────────────────────────────────────┘
```

G7

AUTOMATIC REFLECTION

DEVICE FOR OUTPUTTING HOLDING DETECTION RESULTS

CROSS-REFERENCE TO RELATED APPLICATION

This application is based on Japanese Patent Application No. 2016-255663, filed on Dec. 28, 2016, which is incorporated by reference in the description here.

TECHNICAL FIELD

The present invention relates to a device for outputting holding detection results, which is suitably applied to a device for holding a workpiece.

BACKGROUND ART

Generally, in a factory production line or the like, a pick-and-place device is used as a device for conveying parts, products, and the like (hereinafter, collectively called "workpieces"). In many cases, holding members such as suction pads and chucks are used as holding units for holding parts, but an operator or the like in a production line actually operates and adjusts these pick-and-place devices by trial and error to perform the optimum operation under present circumstances.

However, such a method of making an adjustment by actually operating the devices cannot be carried out unless real devices are completed. Even when real devices are deployed along the production line, since there is a need to suspend original work of the pick-and-place devices or stop the line for adjustment work, there is a problem that the production efficiency is degraded.

As one of methods for solving such a problem, there is proposed a simulation method related to a robot for conveying a workpiece and capable of creating a robot operation program on an image output device provided with a display panel or the like (for example, see Patent Document 1).

CITATION LIST

Patent Document

Patent Document 1: Japanese Patent Application Laid-Open No. H07-256578

SUMMARY

However, in the conventional simulation method described above, only vibration acceleration is estimated or the like using a robot operating speed as a parameter to confirm vibration obtained by a simulation so that an operating speed capable of operating at designated vibration acceleration or less can be determined. Therefore, there is a problem that it cannot be simulated whether a robot can hold a workpiece or not. Particularly, in a robot for conveying a workpiece as mentioned above, it is considered that parameters related to a holding member, such as the shape, material, and the like of the holding member depending on the workpiece used affect the simulation results, but the parameters related to the holding member are not considered at all under present circumstances.

The present invention has been made in view of the circumstances described above, and it is an object thereof to provide a device for outputting holding detection results by a highly accurate simulation in consideration of parameters related to a holding member.

A device for outputting holding detection results according to one aspect of the present invention includes: an input unit for accepting workpiece information including outline information and mass information of a workpiece; a first storage unit for storing plural pieces of holding member information related to a holding member for the workpiece installed in a robot; a first selection unit for simulating whether the workpiece can be held by the holding member or not based on the workpiece information, and selecting, as a holding member candidate, the holding member determined to be able to hold the workpiece as a result of the simulation; and an output unit for outputting the holding member information of the holding member candidate selected by the first selection unit.

According to the above configuration, it can be simulated whether the target workpiece can be held or not based on the input workpiece information. Here, since parameters related to the holding member are considered for simulation, a highly accurate simulation can be realized compared with the conventional simulation method in which these parameters are not considered at all.

In the above aspect, the configuration may be such that the holding member is a suction pad, and the holding member candidate is a suction pad candidate.

In the above aspect, the configuration may be such that the holding member information of the suction pad candidate includes at least any of the shape, material, and diameter of the suction pad, the number of suction pads, and the suction position of the suction pad relative to the workpiece.

In the above aspect, the configuration may be such that the holding member information of the suction pad candidate further includes either one of a manufacturer of the suction pad and the manufacturer's model code.

In the above aspect, the configuration may be such that the holding member information of the suction pad candidate includes the placement of the suction pad relative to the workpiece, the output unit superimposes an image representing the placement of the suction pad on an image representing the workpiece and displays the superimposed image on a display unit, and the device further includes a correction input unit for accepting a correction instruction on the placement of the suction pad displayed on the display unit, and a correction unit for correcting the placement of the suction pad according to the correction instruction.

In the above aspect, the configuration may be such that the outline information of the workpiece includes at least either a variation in workpiece height or the allowance of a suction mark on the workpiece.

In the above aspect, the configuration may be such that the outline information of the workpiece is the roughness of the workpiece surface.

In the above aspect, the configuration may be such that the input unit accepts a vibration tolerance value of the workpiece, and the device further includes a display unit for displaying the vibration tolerance value of the workpiece.

In the above aspect, the configuration may further include: a second storage unit for storing plural pieces of robot information related to the robot; and a second selection unit for selecting, as a robot candidate, robot information of the robot for holding the workpiece from among the plural pieces of robot information based on the workpiece information.

A device for outputting holding detection results according to another aspect of the present invention includes: a workpiece storage unit for storing retrieval information and workpiece information in association with each other for each workpiece; a first storage unit for storing plural pieces of holding member information related to a holding member for the workpiece installed in a robot; an input unit for accepting input of the retrieval information of any of workpieces; an acquisition unit for searching the workpiece storage unit using the input retrieval information of the workpiece as a key to acquire workpiece information corresponding to the input workpiece; a first selection unit for simulating whether the workpiece can be held by the holding member or not based on the acquired workpiece information, and selecting, as a holding member candidate, the holding member determined to be able to hold the workpiece as a result of the simulation; and an output unit for outputting the holding member information of the holding member candidate selected by the first selection unit.

A device for outputting holding detection results according to still another aspect of the present invention includes: a first input unit for accepting workpiece information including outline information and mass information of a workpiece; a second input unit for accepting input of an operating speed or operating acceleration of a robot; a third input unit for accepting input of holding member information related to a holding member for the workpiece installed in the robot; and an output unit for simulating whether the workpiece can be held by the holding member or not based on the workpiece information, and outputting simulation results.

Advantageous Effects of Invention

According to the present invention, there can be provided a device for outputting holding detection results by a highly accurate simulation in consideration of parameters related to a holding member.

BRIEF DESCRIPTION OF DRAWINGS

FIG. 5 is a diagram illustrating the registered content of a suction pad DB.

FIG. 6 is a diagram illustrating a workpiece information input screen.

FIG. 7 is a diagram illustrating a wizard-type workpiece information input screen.

FIG. 8 is a diagram illustrating determination conditions on the success/failure of the suction of the workpiece.

FIG. 17 is a diagram illustrating the suction position of each suction pad.

FIG. 22 is a diagram illustrating a confirmation screen indicating the selection results.

FIG. 24 is a diagram illustrating the registered content of a workpiece information DB.

FIG. 25 is a flowchart illustrating pre-preparation processing by the simulation device.

FIG. 26 is a diagram illustrating an input screen for selecting a target workpiece.

FIG. 27 is a diagram illustrating a workpiece information input screen.

FIG. 37 is a diagram illustrating an input screen.

DESCRIPTION OF EMBODIMENTS

Figure 1:
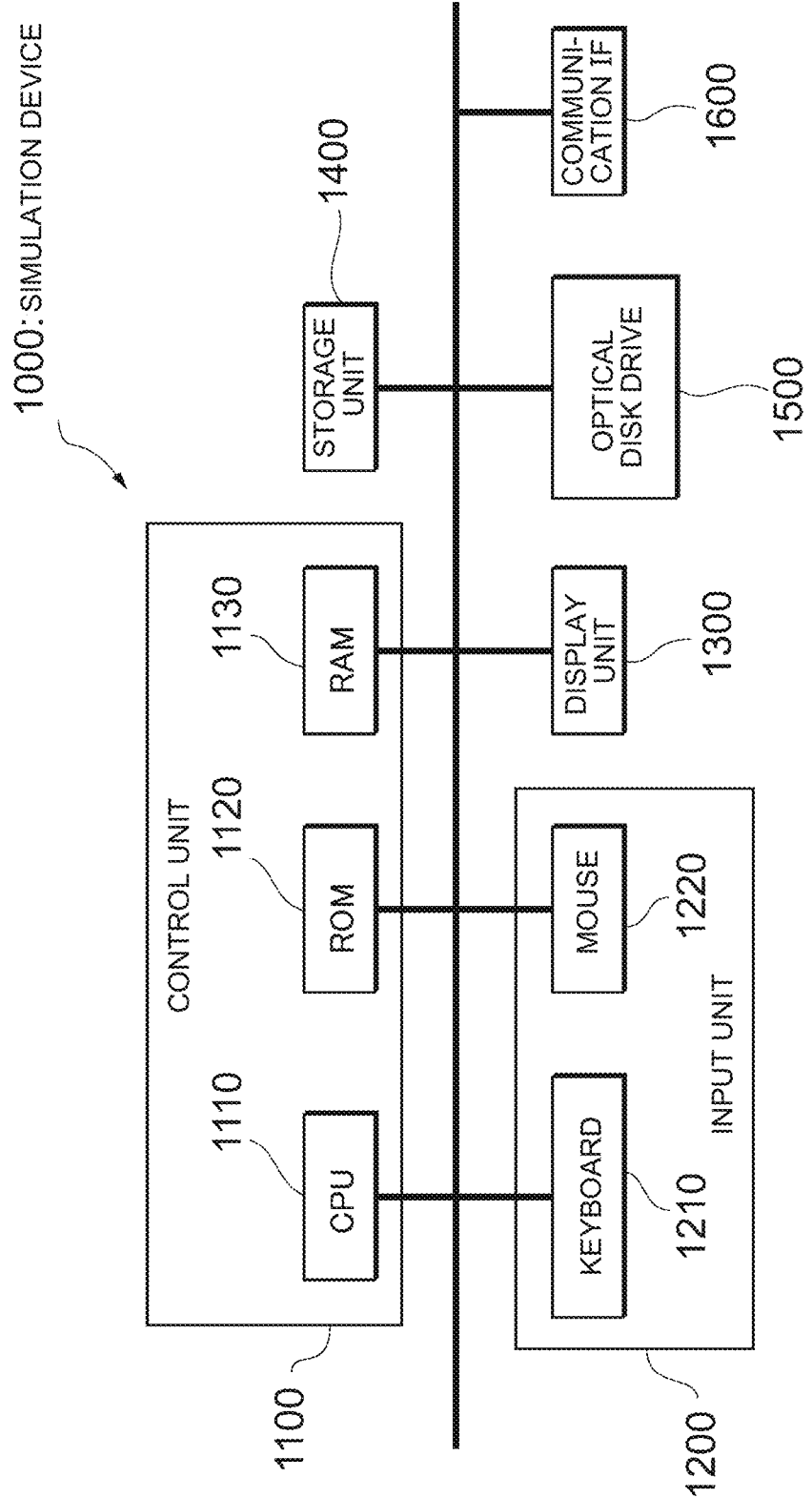
FIG. 1 is a diagram illustrating the hardware configuration of a simulation device in an embodiment.

An embodiment of the present invention will be described in detail below with reference to accompanying drawings. Note that the same reference numerals are given to the same elements to omit redundant description. The following embodiment is an illustrative example for describing the present invention, and is not intended to limit the present invention to the embodiment alone. Various modifications are possible without departing from the scope of the present invention.

A. Embodiment

<1. Configuration>

FIG. 1 is a diagram illustrating the hardware configuration of a simulation device 1000 according to the embodiment. The simulation device 1000 is a device for simulating whether normal holding (including conveying) of a workpiece using a pick-and-place device (robot) is possible, or the like, which is, for example, a personal computer (PC), a work station, or the like. Like a typical PC, as illustrated in FIG. 1, the simulation device 1000 includes a control unit 1100, an input unit 1200, a display unit 1300, a storage unit 1400, an optical disk drive 1500, and a communication interface 1600.

The control unit 1100 plays a function in central control of the simulation device 1000, and includes a CPU (Central Processing Unit) 1110, a ROM (Read Only Memory) 1120, a RAM (Random Access Memory) 1130, and the like. The CPU 1110 performs various processing to be described later based on data and programs stored in the ROM 1120 and the RAM 1130, and controls each unit of the simulation device 1000.

The input unit 1200 includes various operation buttons, a numeric keypad, and the like as well as a keyboard 1210 and a mouse 1220, which are used to input various commands and data to the simulation device 1000.

The display unit 1300 includes a monitor such as a liquid crystal panel, and is used to display simulation results and the like.

The storage unit 1400 is composed of various types of storage devices such as a hard disk drive (HDD) and a flash memory. The optical disk drive 1500 reads data stored in various types of disk media (CD-ROM and Blu-ray disks) and writes data to the various types of disk media under the control of the control unit 1100. The communication interface 1600 is used to exchange data with external devices through various communications (wired and wireless communications, and the like). Note that the simulation function related to the simulation device 1000 may be directly implemented in the pick-and-place device.

<2. Function>

2-1. First Functional Configuration (in a Case where a User Enters Workpiece Information)

Figure 2:
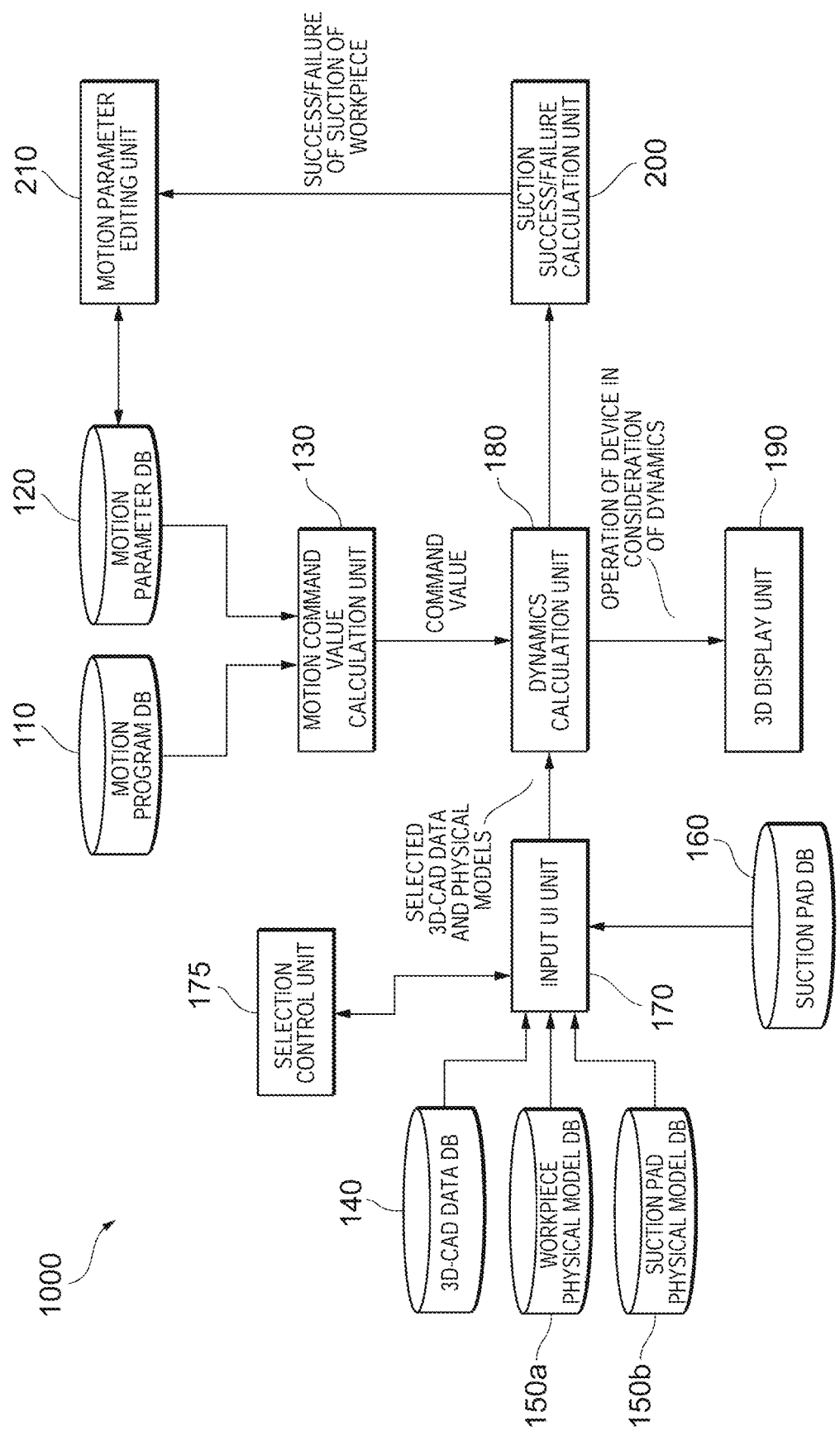
FIG. 2 is a block diagram illustrating a first functional configuration related to the simulation device.

Here, FIG. 2 is a block diagram illustrating a first functional configuration related to the simulation device 1000. The simulation device (device for outputting holding detection results) 1000 implements each unit to be illustrated below by cooperation between software stored in memories such as the ROM 1120 and the RAM 1130, and hardware resources (CPU 1110 and the like). In the embodiment, the operation of a pick-and-place device using a suction pad as a holding member for holding a workpiece such as a part or a product is targeted for simulation, but the operation of a pick-and-place device using a chuck instead of the suction pad may be targeted for simulation to be described later. Further, in the first functional configuration to be described below, it is assumed that the user enters workpiece information (detailed information related to a workpiece to be described later).

As illustrated in FIG. 2, the simulation device 1000 is configured to include a motion program DB 110, a motion parameter DB 120, a motion command value calculation unit 130, a 3D-CAD data DB 140, a workpiece physical model DB 150a, a suction pad physical model DB 150b, a suction pad DB 160, an input user interface (UI) unit 170, a selection control unit 175, a dynamics calculation unit 180, a 3D display unit 190, a suction success/failure calculation unit 200, and a motion parameter editing unit 210.

Figure 3:
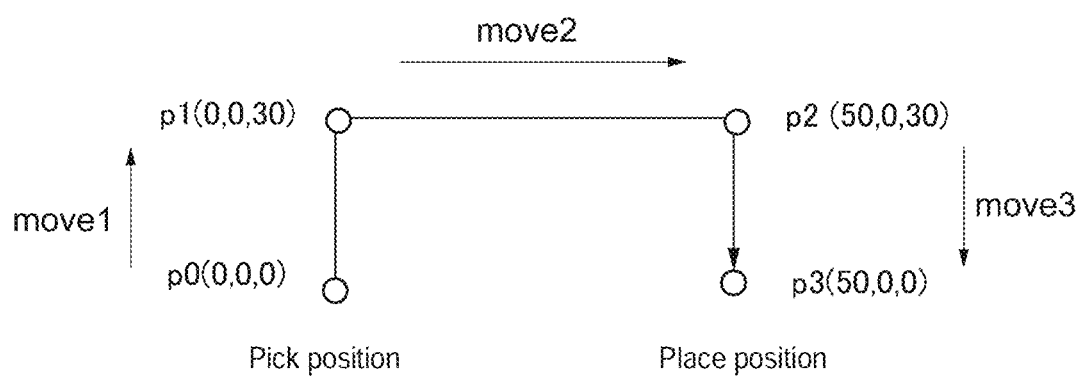
FIG. 3 is a diagram illustrating a motion program and motion parameters.

FIG. 3 is a diagram illustrating a motion program and motion parameters. In the example illustrated in FIG. 3, it is assumed that a holding unit of the pick-and-place device for holding a workpiece is moved from coordinates p0 (0, 0, 0) as a Pick position of the workpiece to coordinates p3 (50, 0, 0) as a Place position of the workpiece via coordinates p1 (0, 0, 30) and coordinates p2 (50, 0, 30) (on the assumption that the coordinate position is expressed, for example, in units of centimeters).

The motion program is a program for giving instructions on the movement of the holding unit of the pick-and-place device. In the example illustrated in FIG. 3, it includes three linear interpolation commands move as illustrated in Table 1.

TABLE 1

<Motion Program>

| Line No. | Command |
| --- | --- |
| 1 | Move move1; |
| 2 | Move move2; |
| 3 | Move move3; |

On the other hand, the motion parameters are composed of target position (motion path), maximum speed, maximum acceleration, and maximum deceleration of the holding unit of the pick-and-place device. In the example illustrated in FIG. 3, the motion parameters as illustrated in Table 2 are set to each command move. Here, a case where the proportion to the standard speed, the standard maximum acceleration, and the standard maximum deceleration set for each pick-and-place device is specified (percentage specified) is exemplified in Table 2, but the motion parameters are not limited thereto. The maximum speed, the maximum acceleration, and the maximum deceleration that constitute the motion parameters may be specified as absolute values.

TABLE 2

<Motion Parameter>

| Command | Target Position | Maximum Speed [%] | Maximum Acceleration [%] | Maximum Deceleration [%] |
| --- | --- | --- | --- | --- |
| move1 | p1 (0, 0, 30) | 100 | 100 | 100 |
| move2 | p2 (50, 0, 30) | 100 | 100 | 100 |
| move3 | p3 (50, 0, 0) | 100 | 100 | 100 |

When a workpiece conveying command about the operation of the pick-and-place device targeted for simulation is input, the motion command value calculation unit 130 reads the motion program illustrated in Table 1 from the motion program DB 110, and reads the motion parameters illustrated in Table 2 from the motion parameter DB 120 to calculate an operation command value.

Figure 4:
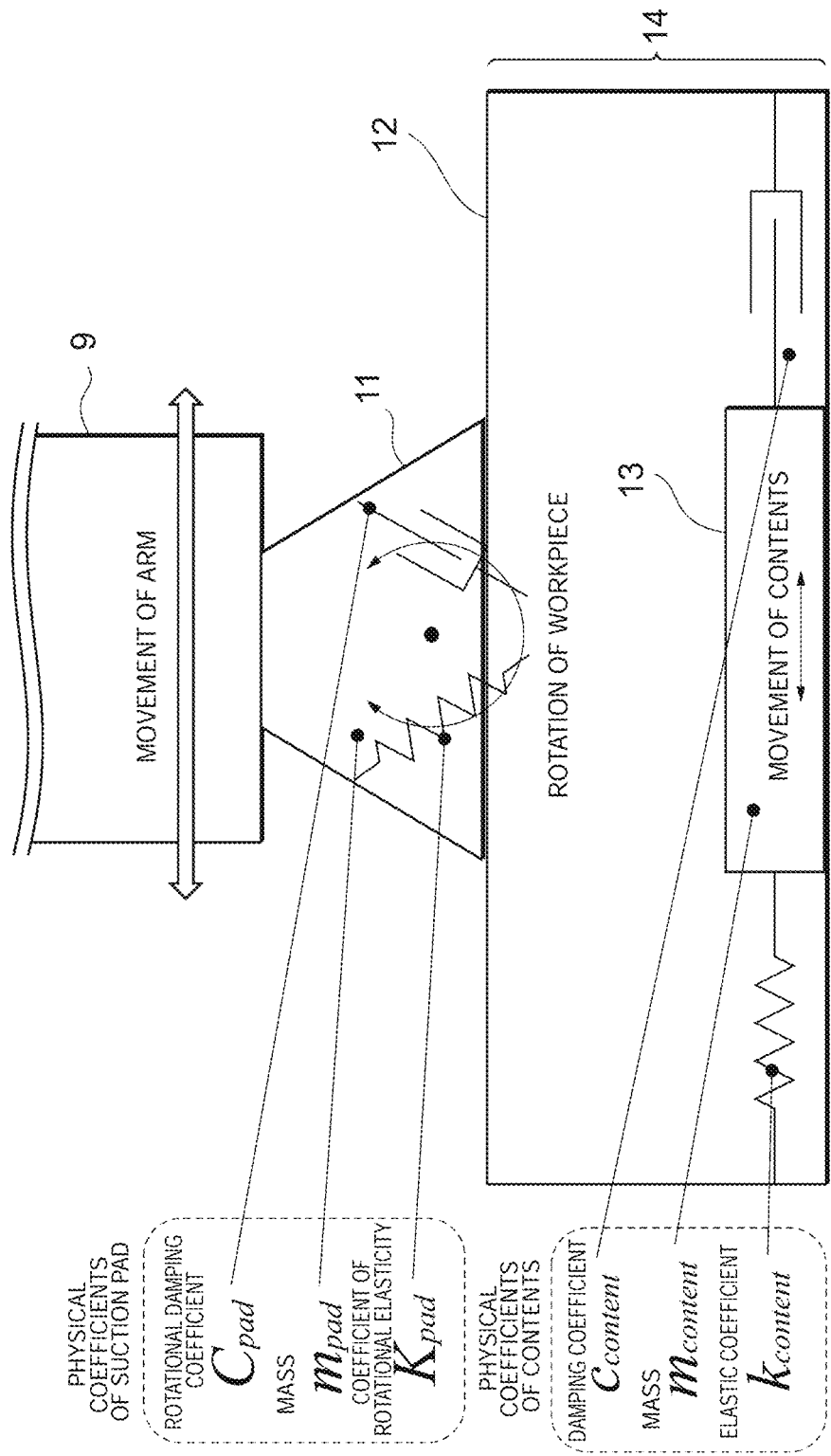
FIG. 4 is a diagram illustrating physical models of a holding unit in a pick-and-place device and a workpiece.

FIG. 4 is a diagram illustrating physical models of a suction pad in the pick-and-place device and a workpiece.

A suction pad 11 is provided at the end of an arm 9 of the pick-and-place device (robot). A workpiece 14 moved by the suction pad 11 of the holding unit of the pick-and-place device includes a container 12 and contents 13.

In the example of FIG. 4, rotational damping coefficient $C_{pad}$, mass $m_{pad}$, and coefficient of rotational elasticity $K_{pad}$ are defined as physical coefficients of the suction pad 11, and damping coefficient $C_{content}$, mass $m_{content}$, and elastic coefficient $k_{content}$ are defined as physical coefficients of the contents 13.

Returning to FIG. 2, data for defining each workpiece physical model are registered in the workpiece physical model DB 150a.

Further, data for defining each suction pad physical model are registered in the suction pad physical model DB 150b.

In the suction pad DB (holding member information) 160, respective tables expressing shapes, materials, and diameters of suction pads usable in operation simulation of the pick-and-place device are stored.

Figure 5:
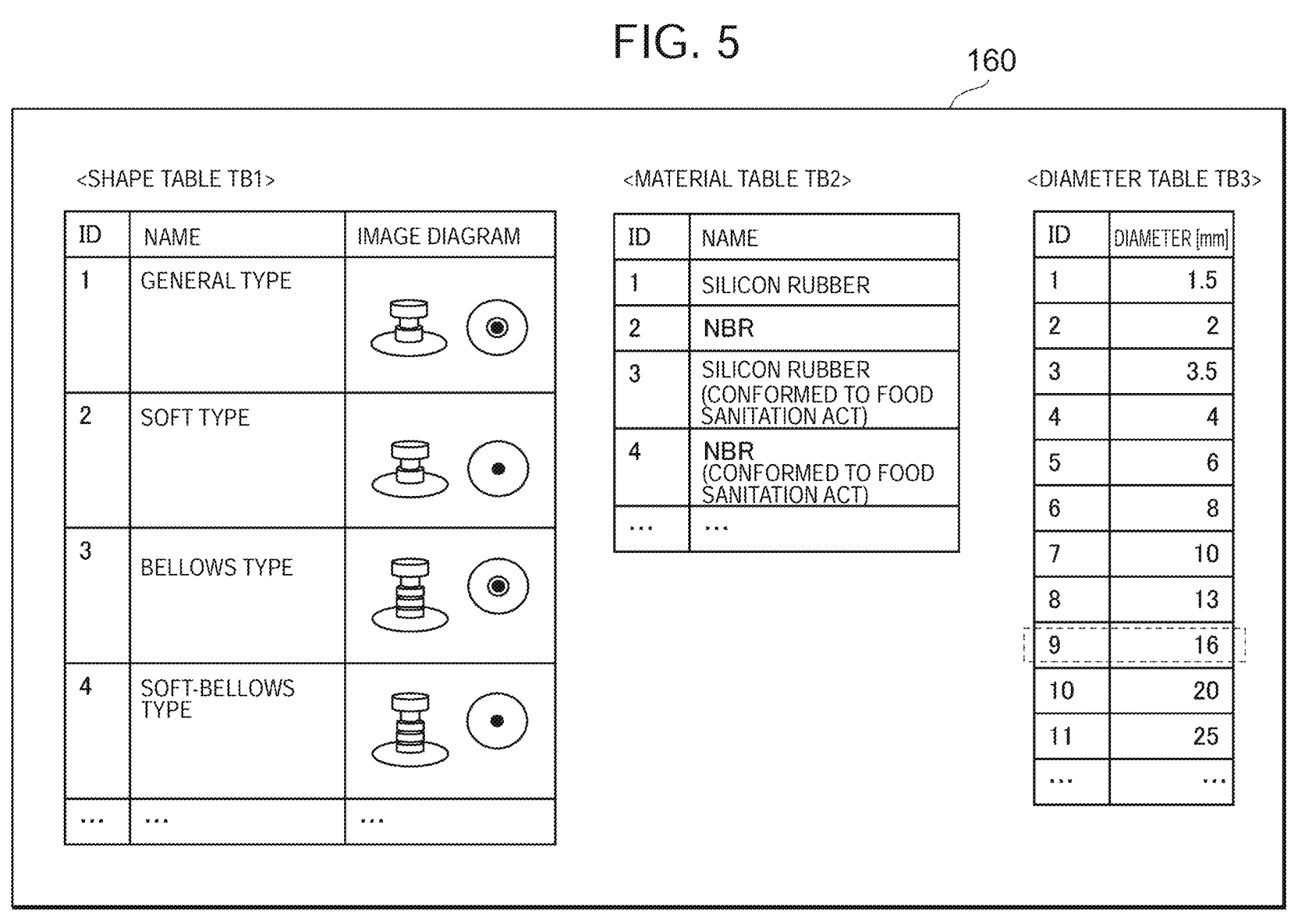

FIG. 5 is a diagram illustrating the registered content of the suction pad DB 160. As illustrated in FIG. 5, various shapes of suction pads are registered in a shape table TB1, various materials of suction pads are registered in a material table TB2, and various diameters of suction pads are registered in a diameter table TB3. However, the registered content of the suction pad DB 160 is not limited to the shapes, materials, and diameters of suction pads, and manufacturer names and manufacturer model codes may also be included.

Returning to FIG. 2, the input user interface (UI) unit 170 is an interface made up of hardware and software to allow a user to enter various kinds of information including the workpiece information.

FIG. 6 is a diagram illustrating a screen image of the input UI unit 170.

As pre-preparation for a simulation of the suction of a workpiece (hereinafter, also simply called "simulation"), a screen (workpiece information input screen) G1 used to input conditions related to a workpiece (i.e., workpiece information) as illustrated in FIG. 6 is displayed on the display unit. Specifically, in addition to workpiece outline information such as a variation in workpiece height C1, the allowance of a suction mark on the workpiece C2, and the roughness of the workpiece surface C3, the mass of the workpiece (mass information) C4, the air resistance of the workpiece C5, the size of a suction part of the workpiece C6, contents of the workpiece C7, whether the contents of the workpiece are food C8, the atmospheric pressure C9, the suction pressure C10, the vibration tolerance during conveyance C11, the vibration tolerance upon placement C12, and the like are displayed on the workpiece information input screen G1. According to the display of this input screen G1, the user selects or enters the workpiece information. Note that the above-described workpiece information is just an example. For example, the angle of rotation of the workpiece (such as an allowable angle of rotation thereof) upon vibration may be specified, for example, instead of the vibration tolerance upon placement. Further, in the example illustrated in FIG. 6, all pieces of workpiece information to be entered by the user are displayed on one screen, but a wizard-type workpiece information input screen G2 on which respective pieces of workpiece information are displayed individually and sequentially, for example, as illustrated in FIG. 7 may be adopted. Further, part of workpiece information such as the atmospheric pressure may be automatically acquired by the simulation device 1000 through a communication network such as the Internet.

Returning to FIG. 2, the selection control unit 175 automatically selects the physical models of the suction pad and the workpiece, the pick-and-place device (i.e., robot), and the like based on the workpiece information and the like input through the input UI unit 170 (the details will be described later).

The dynamics calculation unit 180 reads the operation command value output from the motion command value calculation unit 130, the physical models of the workpiece and the suction pad from the physical model DBs 150a and 150b, and the like to calculate various kinds of data related to the operation of the workpiece and the holding unit in consideration of dynamics (hereinafter, abbreviated as "device operation in consideration of dynamics"). In this case, the dynamics calculation unit 180 takes into account the motion of the workpiece to rotate around the horizontal direction or vertical direction with respect to a conveying surface to determine device operation in consideration of dynamics (for example, a holding force to hold the workpiece, and the like). The dynamics calculation unit 180 outputs the device operation in consideration of dynamics to the 3D display unit 190 and the suction success/failure calculation unit 200.

The 3D display unit 190 displays, on the display unit such as a liquid crystal panel, a 3D image of the device operation in consideration of dynamics after being calculated to make the user or the like recognize the operation simulation of the pick-and-place device. Instead of (or in addition to) displaying the 3D image of the device operation in consideration of dynamics, a 2D image may be displayed, or numerical values may be displayed. Further, any other form may be adopted as long as the device operation in consideration of dynamics can be recognized by the user.

Based on the device operation in consideration of dynamics supplied from the dynamics calculation unit 180, the suction success/failure calculation unit 200 determines the success/failure of the suction of the workpiece by the suction pad 11, and outputs determination result information indicative of the determination result to the motion parameter correction unit 210.

FIG. 8 is a diagram illustrating determination conditions on the success/failure of the suction of the workpiece, where mass of workpiece m, suction force F (N), inertial force ma (N), gravity mg (N), normal force fn (N), and frictional force μfn (N) are illustrated, respectively. In the example illustrated in FIG. 8, when either normal force fn1 or normal force fn2 becomes "zero (0)", the suction success/failure calculation unit 200 determines that the suction of the workpiece is unsuccessful, while in the other case (i.e., when both of the normal force fn1 and the normal force fn2 are larger than "0"), the suction success/failure calculation unit 200 determines that the suction of the workpiece is successful. The suction of the workpiece in the embodiment means a series of operations to hold the workpiece by the pick-and-place device and convey the held workpiece to a destination. The fact that the suction of the workpiece is successful means that the workpiece is conveyed to the destination in a normal state, and the fact that the suction of the workpiece is unsuccessful means that the workpiece falls in the middle of being conveyed to the destination, or the workpiece is conveyed in an abnormal state (for example, the workpiece vibrates greatly).

Returning to FIG. 2, the motion parameter correction unit 210 corrects the motion parameters of the pick-and-place device based on the determination result information supplied from the suction success/failure calculation unit 200, and updates the registered content of the motion parameter DB 120 based on the corrected motion parameters.

Next, an overall flow from input of workpiece information by the user to completion of pre-preparation for the simulation will be described.

2-1-1. Pre-Preparation Processing

Figure 9:
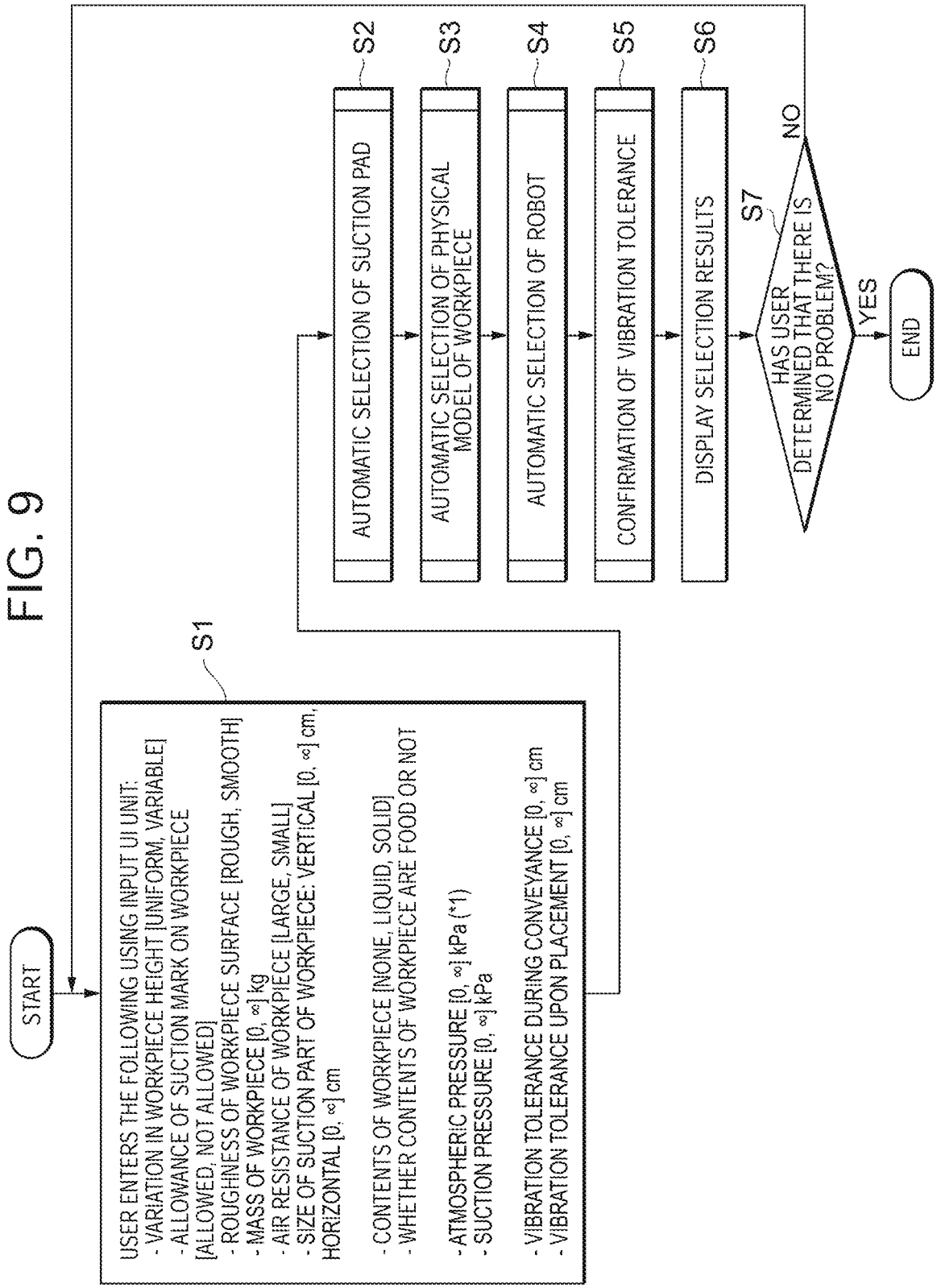
FIG. 9 is a flowchart illustrating pre-preparation processing by the simulation device.

FIG. 9 is a flowchart illustrating pre-preparation processing by the simulation device 1000. Note that the order of processing steps illustrated in the flowchart is just an example, and any order in which the processing steps are executed can be set or the order can be changed arbitrarily.

The user enters workpiece information, through the input UI unit (input unit) 170, on the variation in workpiece height C1, the allowance of the suction mark on the workpiece C2, the roughness of the workpiece surface C3, the mass of the workpiece C4, the air resistance of the workpiece C5, the size of the suction part of the workpiece C6, the contents of the workpiece C7, whether the contents of the workpiece are food C8, the atmospheric pressure C9, the suction pressure C10, the vibration tolerance during transportation C11, and the vibration tolerance upon placement C12 illustrated in FIG. 6 as mentioned above (step S1). Based on the workpiece information and the like input through the input UI unit 170, the selection control unit 175 executes an automatic selection process of a suction pad (step S2), an automatic selection process of a workpiece physical model (step S3), an automatic selection process of a robot (step S4), and a confirmation process of the vibration tolerance (step S5), and then displays the selection results (step S6). When determining that there is a problem with the selection results based on an instruction input from the user (NO in step S7), the selection control unit 175 returns to step S1 to urge the user to correct the workpiece information. On the other hand, when determining that there is no problem with the selection results based on the instruction input from the user (YES in step S7), the selection control unit 175 ends the pre-preparation processing. The operation of the automatic selection process of a suction pad and subsequent processes will be described in detail below with reference to the accompanying drawings.

2-1-1-1. Automatic Selection Process of Suction Pad

Figure 10:
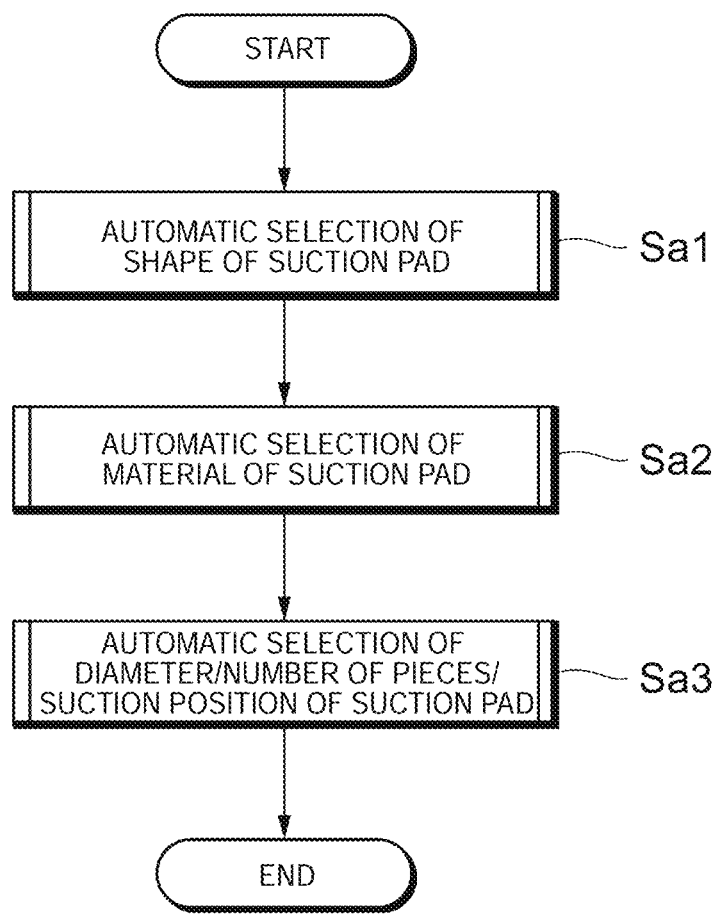
FIG. 10 is a flowchart illustrating an automatic selection process of a suction pad.

When receiving a command indicating the start of the automatic selection process of a suction pad, the selection control unit (first selection unit) 175 starts the automatic selection process of a suction pad as illustrated in FIG. 10. Specifically, the selection control unit 175 makes first an automatic selection of a shape of the suction pad (step Sa1), then an automatic selection of a material of the suction pad (step Sa2), and finally automatic selections of a diameter of the suction pad, the number of suction pad pieces, and a suction position (step Sa3). After that, the selection control unit 175 ends the processing. The details of each step is as follows.

(1) Automatic Selection Process of Suction Pad

Figure 11:
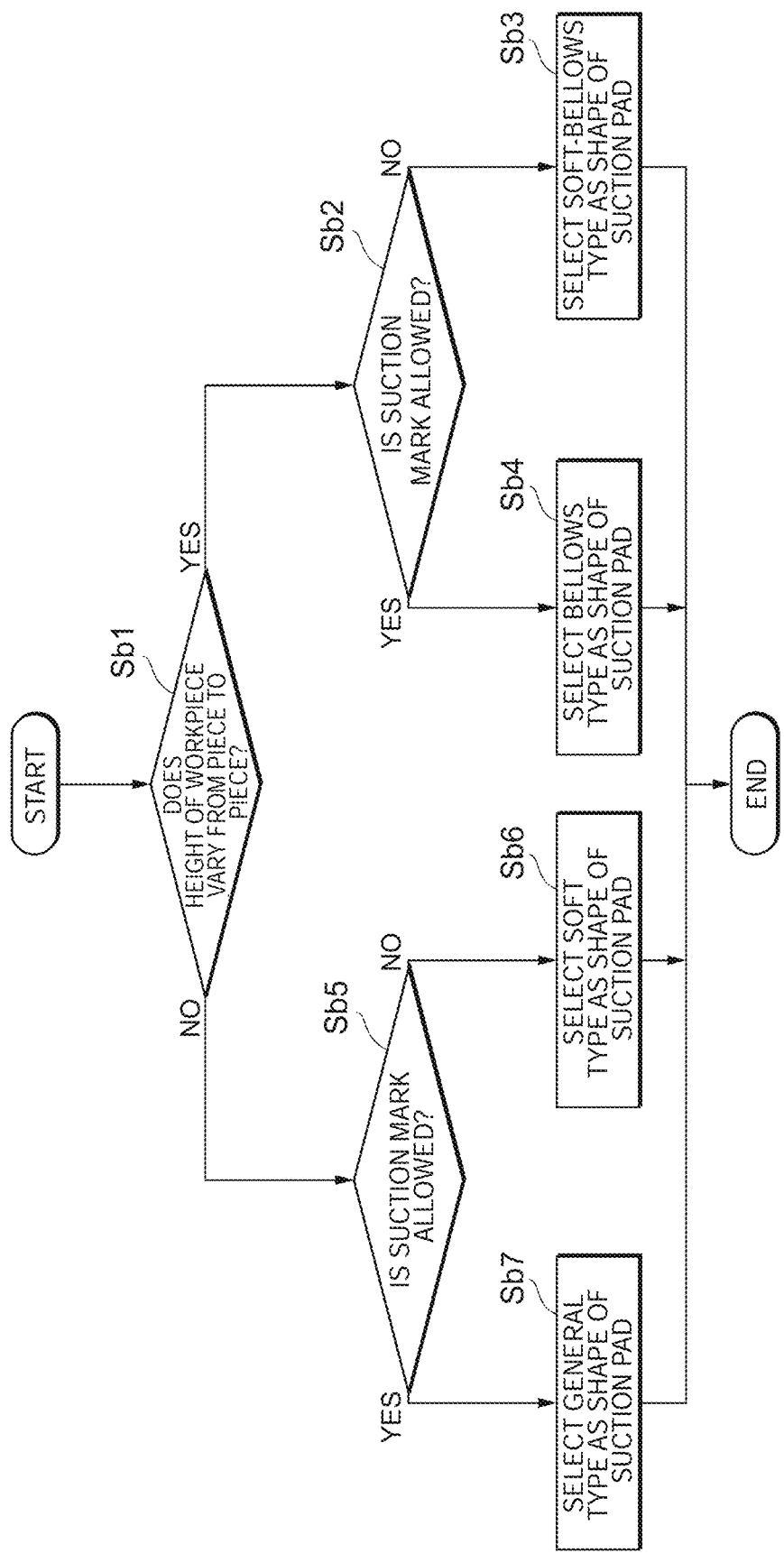
FIG. 11 is a flowchart illustrating an automatic selection process of the shape of the suction pad.

FIG. 11 is a flowchart illustrating the automatic selection process of the shape of the suction pad.

The selection control unit 175 refers to the input workpiece information to determine whether the height of the workpiece varies from piece to piece (step Sb1). When determining that the height of the workpiece varies (YES in step Sb1), the selection control unit 175 further refers to the workpiece information to determine whether a suction mark is allowed or not (step Sb2). When determining that workpiece information indicating that the suction mark is not allowed is input (NO in step Sb2), the selection control unit 175 selects "Soft-Bellows Type" as the shape of the suction pad (step Sb3), and ends the process. On the other hand, when determining that workpiece information indicating that the suction mark is allowed is input (YES in step Sb2), the selection control unit 175 selects "Bellows Type" as the shape of the suction pad (step Sb4), and ends the process.

Further, when determining in step Sb1 that the height of the workpiece does not vary from piece to piece (i.e., it is uniform) (NO in step Sb1), the selection control unit 175 further refers to the workpiece information to determine whether the suction mark is allowed or not (step Sb5). When determining that workpiece information indicating that the suction mark is not allowed is input (NO in step Sb5), the selection control unit 175 selects "Soft Type" as the shape of the suction pad (step Sb6), and ends the process. On the other hand, when determining that workpiece information indicating that the suction mark is allowed is input (YES in step Sb5), the selection control unit 175 selects "General Type" as the shape of the suction pad (step Sb7), and ends the process.

(2) Automatic Selection Process of Material of Suction Pad

Figure 12:
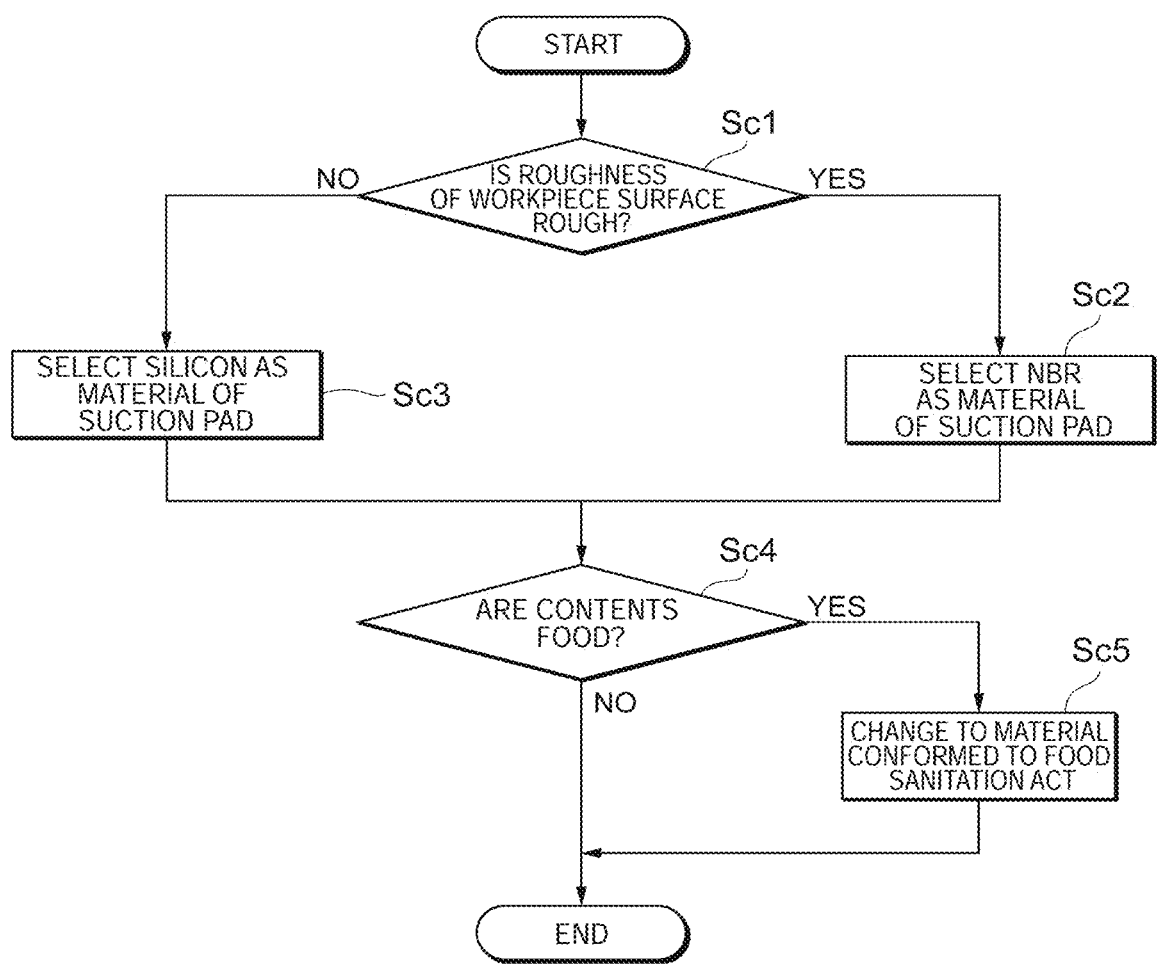
FIG. 12 is a flowchart illustrating an automatic selection process of the material of the suction pad.

FIG. 12 is a flowchart illustrating the automatic selection process of the material of the suction pad.

The selection control unit 175 refers to the input workpiece information to determine whether the roughness of the workpiece surface is rough or not (step Sc1). When determining that the workpiece surface is rough (YES in step Sc1), the selection control unit 175 selects nitrile rubber (NBR) as the material of the suction pad (step Sc2), while when determining that the workpiece surface is not rough (i.e., it is smooth) (NO in step Sc1), the selection control unit 175 selects "Silicon" as the material of the suction pad (step Sc3). After selecting the material of the suction pad in step Sc2 or step Sc3, the selection control unit 175 refers to the workpiece information again to determine whether the contents of the workpiece are "Food" or not (step Sc4). When determining that the contents of workpiece are "Food" (YES in step Sc4), the selection control unit 175 changes the material to a material conformed to the Food Sanitation Act (step Sc5), and ends the process. On the other hand, when determining that the contents of the workpiece are not "Food" (NO in step Sc4), the selection control unit 175 ends the process without changing the material of the suction pad.

Figure 13:
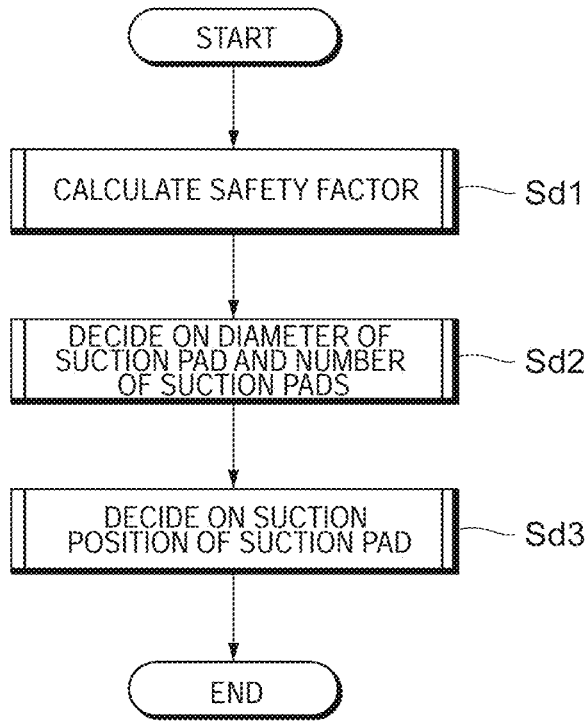
FIG. 13 is a flowchart illustrating an automatic selection process of the diameter of the suction pad, the number of suction pads, and a suction position.

(3) Automatic Selection Process of Diameter of Suction Pad, Number of Pieces, and Suction Position FIG. 13 is a flowchart illustrating the automatic selection process of the diameter of the suction pad, the number of suction pad pieces, and the suction position.

The selection control unit 175 refers to the input workpiece information to calculate a safety factor (step Sd1) so as to decide on the diameter of the suction pad and the number of suction pad pieces (step Sd2) and decide on the suction position of the suction pad (step Sd3), and ends the process. The details of each of step Sd1 (a process of calculating the safety factor), step Sd2 (a process of deciding on the diameter of the suction pad and the number of suction pad pieces), and step Sd3 (a process of deciding on the suction position of the suction pad) will be described below.

(3-1) Process of Calculating Safety Factor

Figure 14:
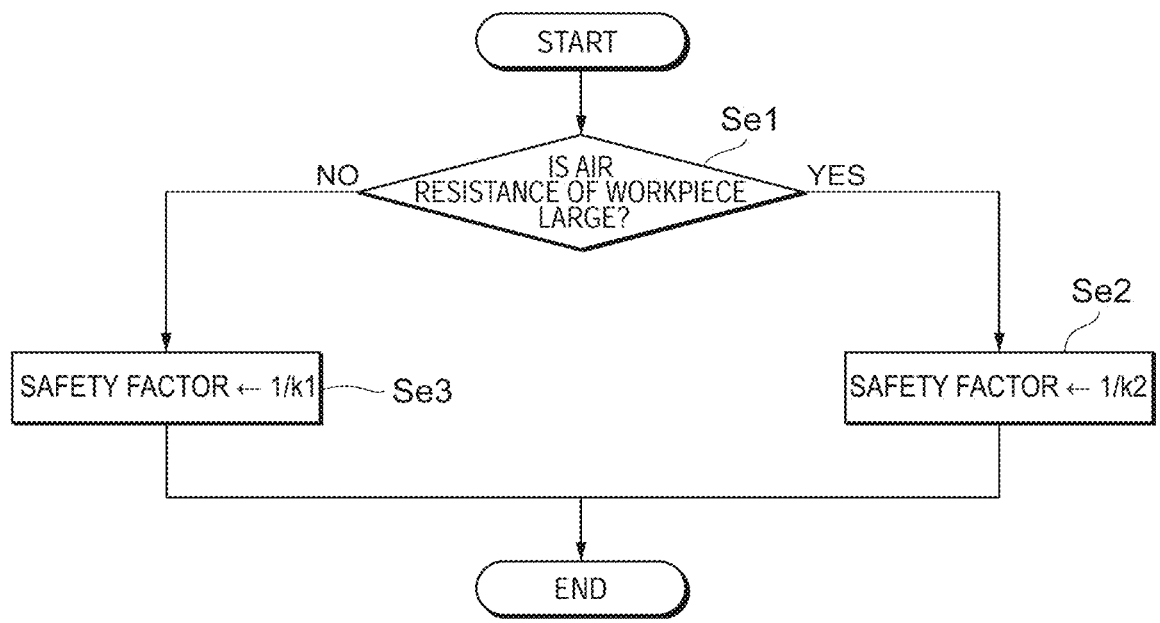
FIG. 14 is a flowchart illustrating a calculation process of a safety factor.

FIG. 14 is a flowchart illustrating the process of calculating the safety factor. Here, "safety factor SF" means a coefficient for setting a force of lifting the workpiece by the suction of the suction pad (lift force) to a value with a margin more than a theoretical value. In the following description, $k1$ and $k2$ are constants which satisfy a relation of $k1<k2$. Although the constants $k1$ and $k2$ are optional, $k1=4$ may be set, for example.

The selection control unit 175 refers to the input workpiece information to determine whether the air resistance of the workpiece is large (step Se1). When determining that the air resistance of the workpiece is large (YES in step Se1), the selection control unit 175 sets safety factor $SF=1/k2$ (step Se2), and ends the process, while when determining that the air resistance of the workpiece is small (NO in step Se1), the selection control unit 175 sets safety factor $SF=1/k1$ (step Se3), and ends the process.

Figure 15:
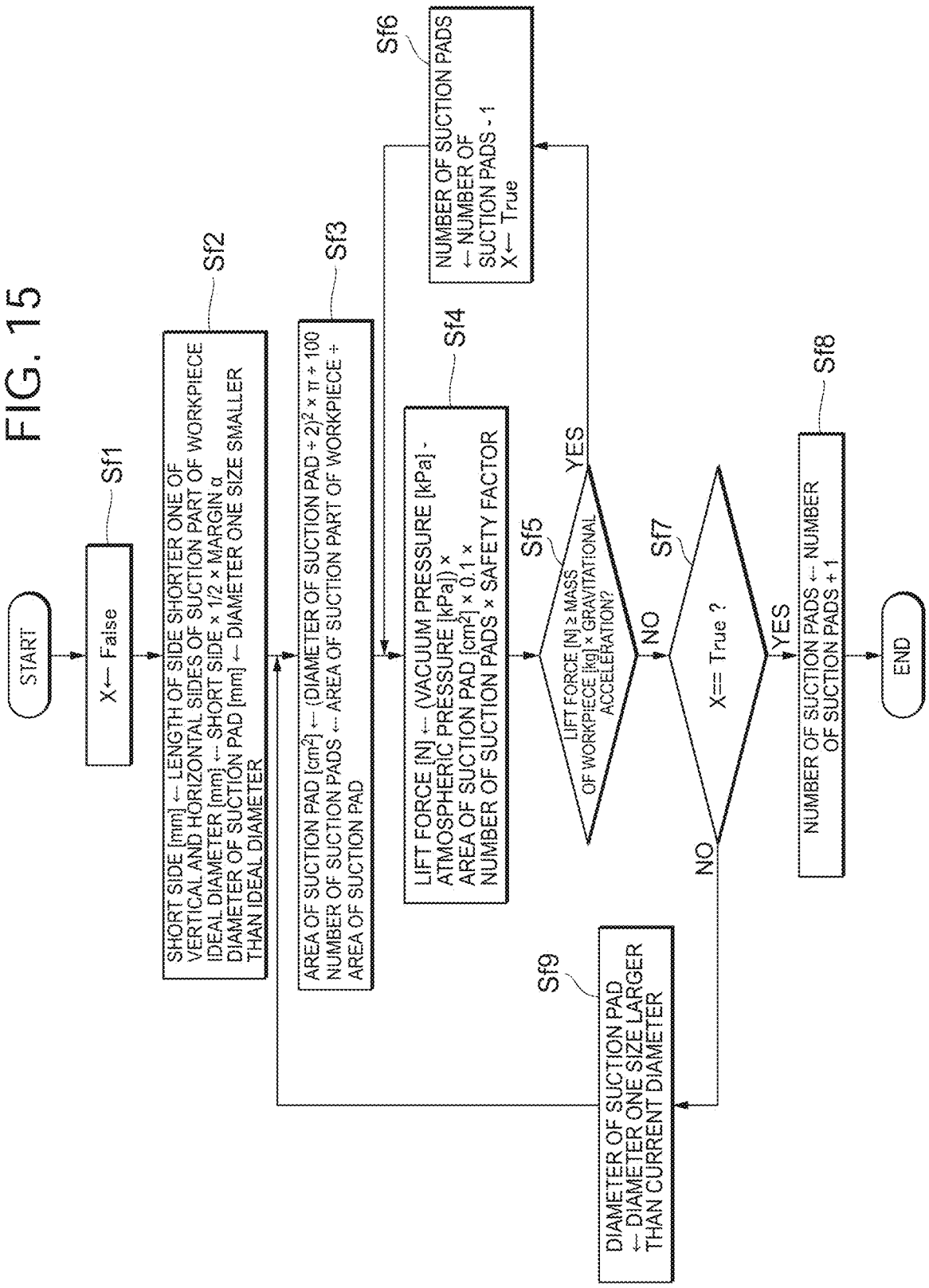
FIG. 15 is a flowchart illustrating a process of deciding on the diameter of the suction pad and the number of suction pads.

(3-2) Process of Deciding on Diameter of Suction Pad and Number of Suction Pad Pieces FIG. 15 is a flowchart illustrating the process of deciding on the diameter of the suction pad and the number of suction pad pieces. The selection control unit 175 first assigns "False" to "X" (step Sf1), and then derives a short side Sn (mm), an ideal diameter Di (mm), and a diameter Da (mm)

of the suction pad using the input workpiece information and the following conditions (1) to (3) (step Sf2).

<Conditions>

(1) The short side Sn is the length of a side shorter one of vertical and horizontal sides of the suction part of the workpiece.

(2) The ideal diameter Di is (short side Sn×½)×margin α.

(3) The diameter Da of the suction pad is a diameter one size smaller than the ideal diameter Di.

Note that margin α is a margin value for preventing the suction pad from sticking out from the workpiece due to suction misalignment, and it is set to about 10%, for example.

Further, the selection control unit 175 uses the workpiece information and the following equations (A) and (B) to determine the area of the suction pad Ap (cm²) and the number of suction pads Np (step Sf3):

$$Ap = (\text{diameter } Da \text{ of suction pad}/2)^{2} * \pi / 100 \quad (A)$$

$$Np = \text{area of suction part of workpiece}/\text{area of suction pad } Ap \quad (B)$$

Further, the selection control unit 175 uses the workpiece information and the following equation (C) to determine a lift force Fl (N) (step Sf4):

$$Fl = (\text{vacuum pressure(kPa)} - \text{atmospheric pressure (kPa)}) * \text{area of suction pad } Ap(\text{cm}^2) * 0.1 * \text{number of suction pads } Np * \text{safety factor } SF \quad (C)$$

Note that the atmospheric pressure may be ignored in Equation (C).

The selection control unit 175 determines whether the determined lift force Fl (N) satisfies the following expression (D) (step Sf5):

$$Fl \geq \text{mass of workpiece(kg)} * \text{gravitational acceleration} \quad (D)$$

When determining that the determined lift force Fl (N) satisfies the expression (D) (YES in step Sf5), the selection control unit 175 resets, as the number of suction pads Np, a value obtained by subtracting "1" from the number of suction pads Np currently set, assigns "True" to "X" (step Sf6), and returns to step Sf4. Note that step Sf6 aims to reduce the number of suction pads Np up to a number minimally required to lift the workpiece.

When determining that the lift force Fl (N) does not satisfy the expression (D) (that is, it is short of the force of lifting the workpiece) during execution of step Sf4→step Sf5→step Sf6 (NO in step Sf5), the selection control unit 175 proceeds to step Sf7 to determine whether "True" is assigned to "X".

When determining that "True" is assigned to "X" (YES in step Sf7), the selection control unit 175 resets, as the number of suction pads Np, a value obtained by adding "1" to the number of suction pads Np currently set (step Sf8), and ends the process. Here, the fact that "True" is assigned to "X" means that step Sf6 is executed one or more times to reduce the number of suction pads Np by one or more. In other words, since it is considered that the force of lifting the workpiece runs short as a result of reducing the number of suction pads Np too much, the number of suction pads Np reduced too much is returned to the previous state in step Sf8.

On the other hand, when determining that "True" is not assigned to "X" (NO in step Sf7), the selection control unit 175 resets the diameter Da of the suction pad to a diameter one size larger than the diameter of the suction pad currently set (step Sf9), and returns to step Sf3. Here, the fact that "True" is not assigned to "X", that is, "False" remains to be assigned to "X" means step Sf6 is not executed at all, that is, the number of suction pads Np is never reduced. In this case, since it is obvious that the currently set diameter of the suction pad is not enough to lift the workpiece, the diameter is changed to a diameter one size larger. Since the operation after returning to step Sf3 is already described, redundant description will be omitted.

Here, a case where the diameter of the suction pad and the number of suction pads are decided by using the registered content (see FIG. 5) of the suction pad DB 160 and the workpiece information (see FIG. 6) entered by the user will be described by taking a specific example.

The selection control unit 175 refers to the workpiece information and the suction pad DB 160 to derive, for example, short side Sn=4 (cm), ideal diameter Di=(4 (cm)× ½)×margin α (=10%)=1.8 (cm), and diameter Da of suction pad=16 (mm)<1.8 cm (see step Sf2 and see a portion enclosed by the broken line in FIG. 5).

Further, the selection control unit 175 refers to the workpiece information and the suction pad DB 160 to derive area of suction pad Ap (cm²)=(16/2)²*π/100=2 (cm²), and number of suction pads Np=32/2=16 (see step Sf3).

Further, the selection control unit 175 refers to the workpiece information and the suction pad DB 160 to determine lift force Fl (N)=(60−9)*2*0.1*16*safety factor SF (=¼) =40.8 (N) (see step Sf4). Since the determined lift force Fl (N)=40.8 (N) is larger than 9.8 (N)(=mass of workpiece (kg)*gravitational acceleration) (see YES in step Sf5), the selection control unit 175 further reduces the number of suction pads Np (see step Sf6), and returns to step Sf4.

When determining that the number of suction pads Np=3 and the lift force Fl (N)=7.65 (N) becomes smaller than 9.8(N) (=mass of workpiece (kg)*gravitational acceleration), that is, when determining that the workpiece cannot be lifted because the number of suction pads is reduced too much (see step Sf5→YES in step Sf7) during execution of step Sf4→step Sf5→step Sf6, the selection control unit 175 adds one to the number of suction pads Np reduced too much to make the number four, and ends the process. Thus, the selection control unit 17 finally decides on the diameter Da of the suction pad=16 (mm), and the number of suction pads Na=4.

(3-3) Process of Deciding on Suction Position of Suction Pad

Figure 16:
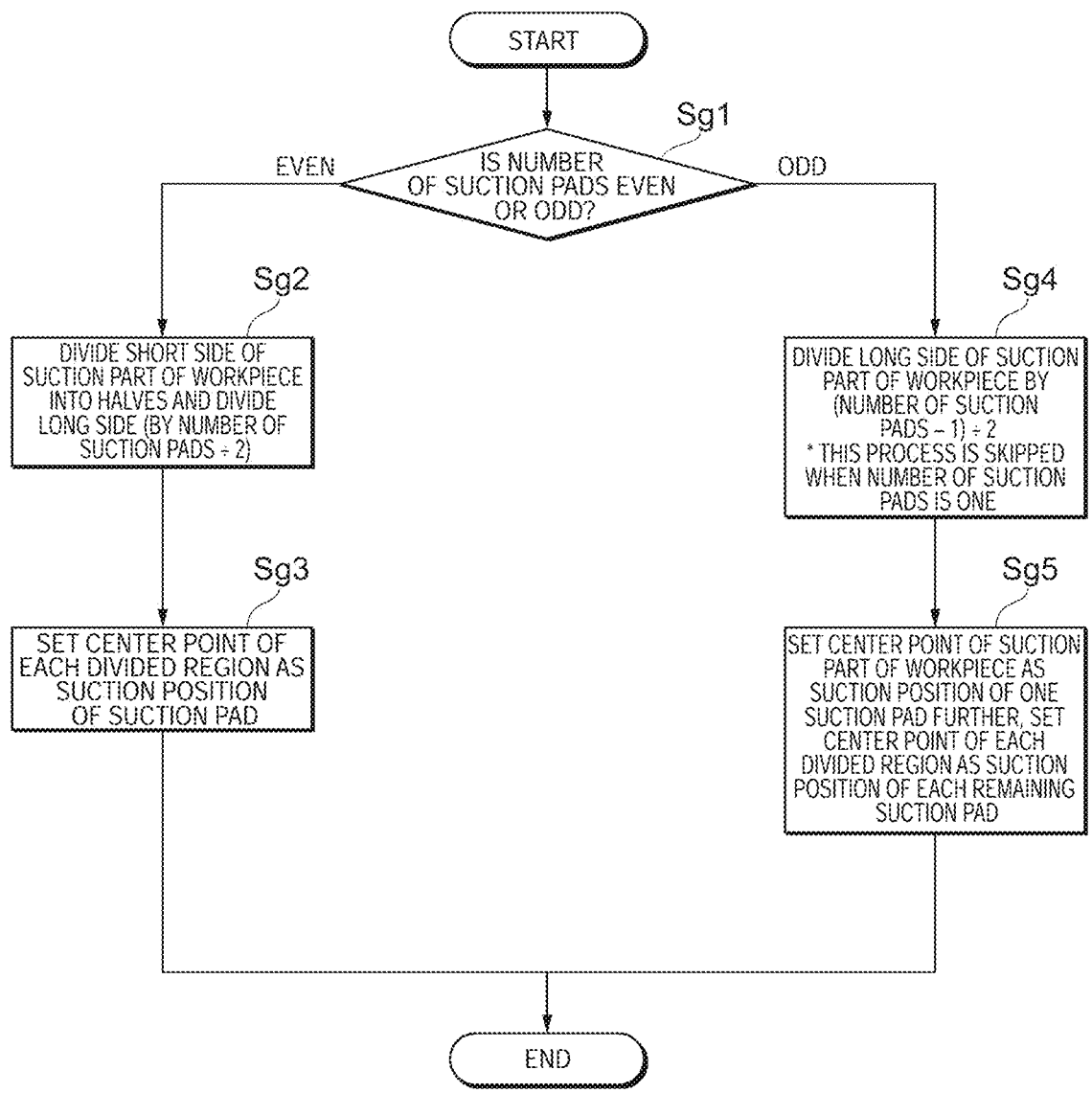
FIG. 16 is a flowchart illustrating a process of deciding on the suction position of the suction pad.

FIG. 16 is a flowchart illustrating the process of deciding on the suction position of the suction pad. The selection control unit 175 determines whether the number of suction pads Np, decided by the process of deciding on the diameter of the suction pad and the number of suction pad pieces as described above, is even or odd (step Sg1). When determining that the number of suction pads Np is even, the selection control unit 175 divides the short side Sn of the suction part of the workpiece into halves, and divides a long side Ln by (number of suction pads Np/2) (step Sg2). Then, the selection control unit 175 sets the center point of each divided region as the suction position of the suction pad (step Sg3), and ends the process.

On the other hand, when determining that the number of suction pads Np is odd, the selection control unit 175 divides the long side of the suction part of the workpiece by (number of suction pads Np−1) (step Sg4). Note that when the number of suction pads Np=1, step Sg4 is skipped. Then, the selection control unit 175 sets the center point of the suction part of the workpiece as the suction position of one suction pad, and sets the center point of each divided region as the suction position of each remaining suction pad (step Sg5), and then ends the process.

Here, FIG. 17 is a diagram illustrating the suction position of each suction pad in cases different in number of suction pads. In FIG. 17, it is assumed that the area of the suction part of the workpiece is in the case of short side Sn=4 (cm) and long side Ln=8 (cm).

As illustrated at E1 in FIG. 17, in the case of the number of suction pads Np=4 (even), the selection control unit 175 divides the short side Sn into halves, divides the long side Ln is divided into halves (=4/2), and sets the center point of each region as each suction position, while as illustrated at E2 in FIG. 17, in the case of the number of suction pads Np=6 (even), the selection control unit 175 divides the short side Sn into halves, divides the long side Ln into three parts (=6/2), and sets the center point of each region as each suction position (for both cases, see step Sgt→step Sg2→step Sg3 illustrated in FIG. 16).

Further, as illustrated at E3 in FIG. 17, in the case of the number of suction pads Np=3 (odd), the selection control unit 175 sets the center point of the suction part of the workpiece as the suction position of one suction pad, and sets the center point of each region, obtained by dividing the long side Ln into halves (=3−1), as each suction position, while as illustrated at E4 in FIG. 17, in the case of the number of suction pads Np=1 (odd), the selection control unit 175 sets the center point of the suction part of the workpiece as the suction position of one suction pad (for both cases, see step Sg1→step Sg4→step Sg5 illustrated in FIG. 16).

Figure 18:
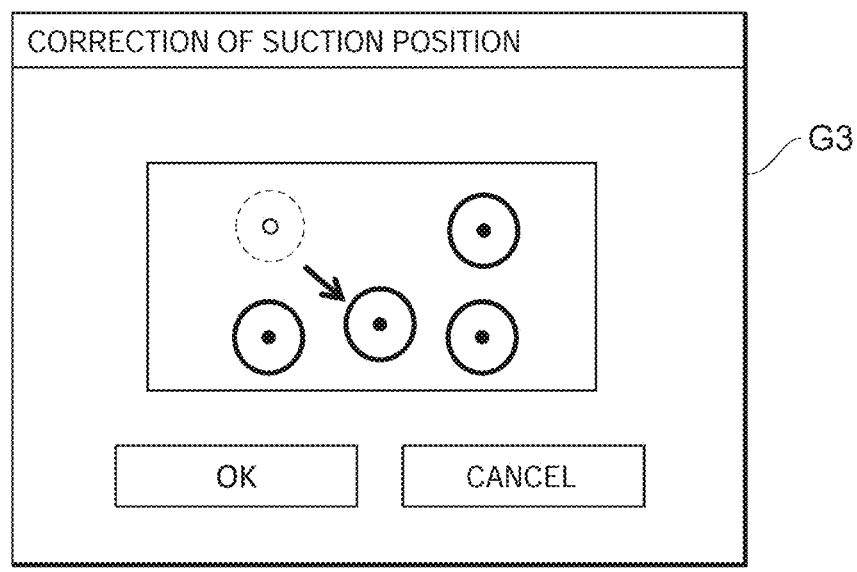
FIG. 18 is a diagram illustrating an input screen when the suction position of a suction pad is decided/corrected.

In the above description, the selection control unit 175 decides on the suction position automatically according to an algorithm, but the decided suction position may be corrected manually. Further, instead of deciding on the suction position automatically, the suction position may be decided and corrected manually from the first. FIG. 18 is a diagram illustrating an input screen G3 when the suction position is decided and corrected manually. The user manipulates the mouse 1220 and the like properly to move the position of each suction pad displayed on the screen to a desired position (see the arrow illustrated in FIG. 18). Thus, the suction position of the suction pad may be decided and/or corrected manually.

2-1-1-2. Automatic Selection Process of Workpiece Physical Model

Figure 19:
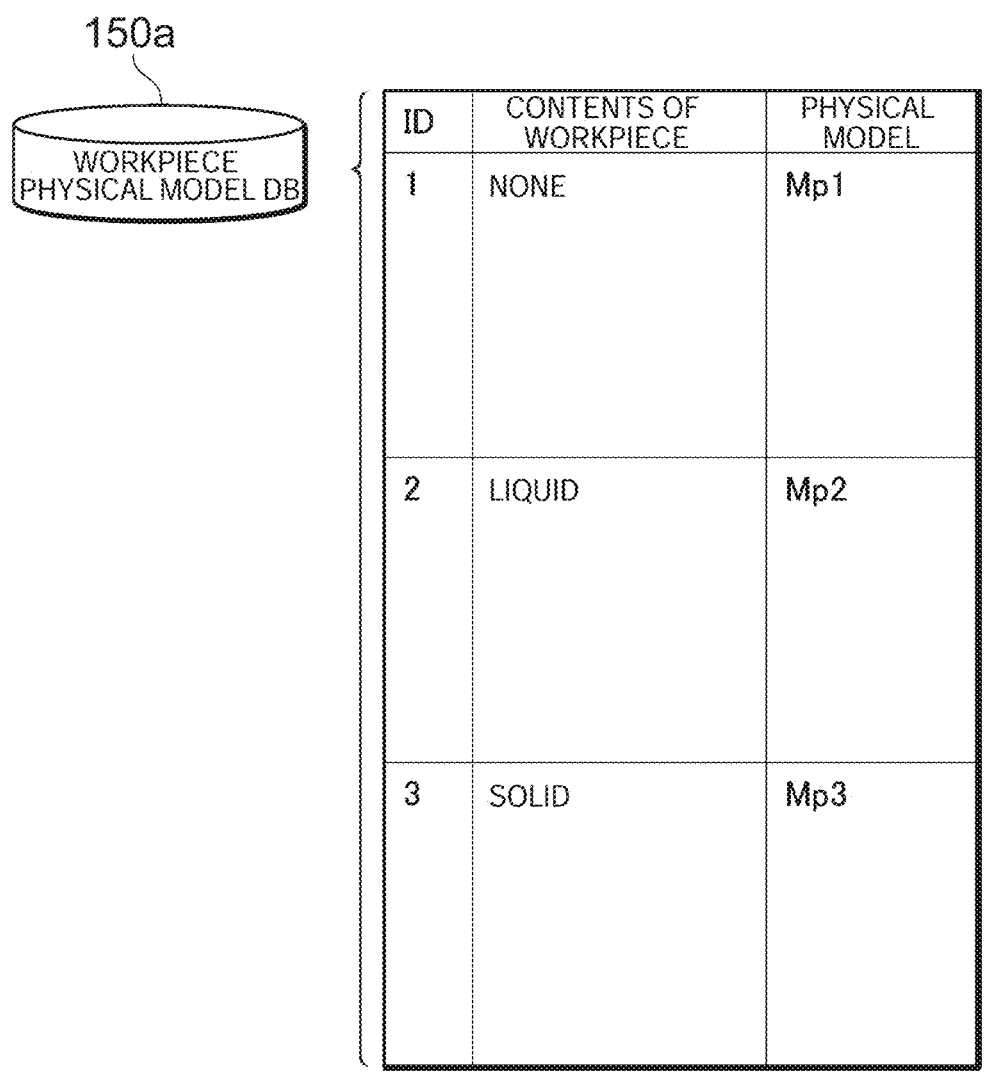
FIG. 19 is a diagram illustrating the registered content of workpiece physical models.

The selection control unit 175 acquires a corresponding physical model from the workpiece physical model DB 150a according to the workpiece information (specifically, the contents of the workpiece, and the like) entered by the user. As an example, as illustrated in FIG. 19, it is considered that physical model Mp1 when the contents of workpiece are none, physical model Mp2 when the contents of workpiece are liquid, physical model Mp3 when the contents of workpiece are solid, and the like are registered in the workpiece physical model DB 150a, but the present invention is not limited thereto, and various physical models can be registered in the workpiece physical model DB 150a.

2-1-1-3. Automatic Selection Process of Robot

The selection control unit 175 automatically selects a robot of the pick-and-place device to convey the workpiece based on the workpiece information (specifically, the mass of the workpiece, whether the contents of the workpiece are food, and the like) entered by the user.

Figure 20:
FIG. 20 is a diagram illustrating an input screen related to the automatic selection of a robot.

FIG. 20 is a diagram illustrating an input screen G4 related to the automatic selection of a robot.

On the input screen G4 related to the automatic selection of a robot, requested spec Ir, type of robot Ik, search results Rs, and preview image Pp are displayed. In a payload entry field of the requested spec Ir, the "mass of the workpiece (see FIG. 6)" entered by the user is automatically reflected, and in a checkbox for "adapted to clean room" in the requested spec Ir, the input result of whether the contents of the workpiece are "food" or not (see FIG. 6) is automatically reflected. Further, in checkboxes in the type of robot Ik, for example, a suitable type of robot ("scalar" in the example of FIG. 20) is automatically reflected based on the contents of the workpiece, the conveyance route of the workpiece, and the like.

Based on the requested spec Ir and the type of robot Ik, the selection control unit (second selection unit) 175 selects robot information on robot candidates from an unillustrated database (second storage unit) in which robot information (manufacturer name, model code, type of robot, etc.) on plural robots is stored, and displays automatic selection results (search results) Rs. From among plural robot selection candidates displayed, the user selects a robot suitable for the workpiece this time (see the shaded portion illustrated in FIG. 20). When such an operation is performed, a preview image Pp of the selected robot is displayed on the input screen G4. Instead of that the user finally selects the robot, a robot used by the selection control unit 175 may be finally decided.

2-1-1-4. Confirmation Process of Vibration Tolerance

Figure 21:
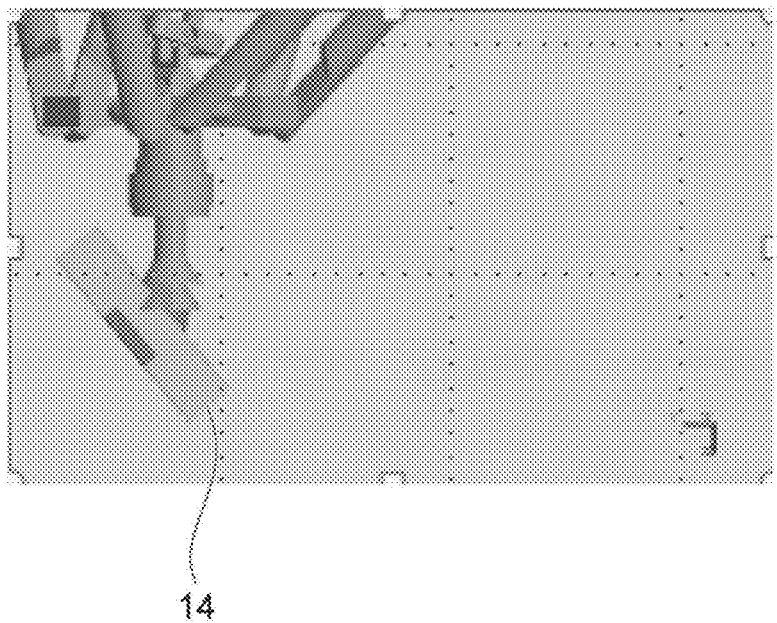
FIG. 21 is a diagram illustrating a state where a workpiece vibrates within a tolerance.

Based on the workpiece information (specifically, the vibration tolerance during transportation and the like) entered by the user, the selection control unit 175 displays, on the display panel or the like, a state where the workpiece 14 vibrates within the tolerance, for example, as illustrated in FIG. 21 so that the user can visually recognize the set vibration tolerance (for example, 1.0 (cm)).

Figure 22:
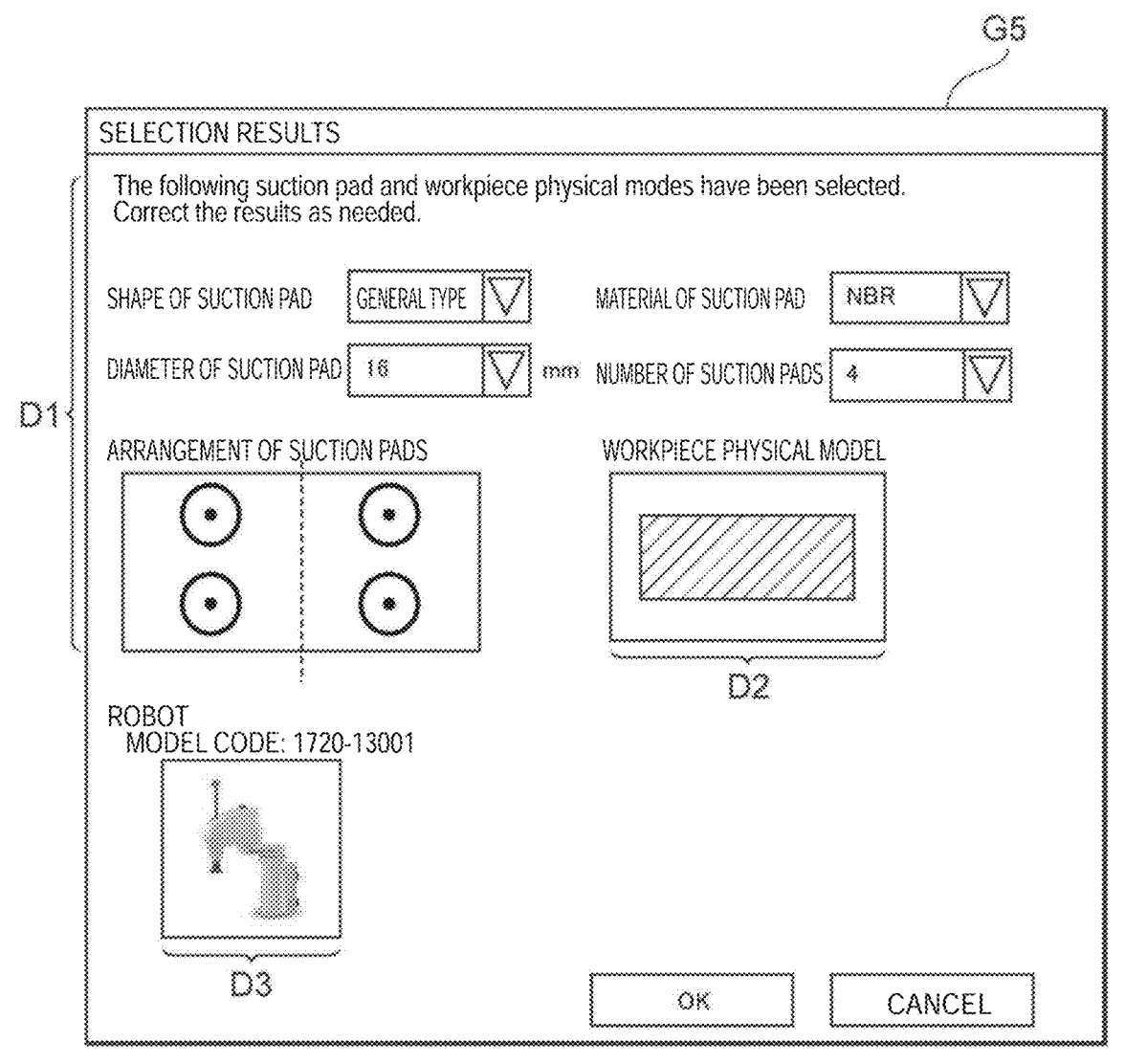

Returning to FIG. 9, when selecting the suction pad, the workpiece physical model, and the robot through 2-1-1-1. Automatic selection process of suction pad to 2-1-1-4. Confirmation process of vibration tolerance as described above, the selection control unit (output unit) 175 displays, on the display panel or the like, a confirmation screen G5 for indicating the selection results as illustrated in FIG. 22 (step S6) to make a final confirmation to the user whether preparation before performing the simulation can be completed or not. In the example illustrated in FIG. 22, "general type," "NBR," "16 (mm)," and "4" are selected as the shape, material, diameter of the suction pad, and the number of suction pad pieces, respectively. In addition, an image picture and type of selected robot are displayed on the display panel or the like together with images representing the selected placement of suction pads and the physical model.

Here, for example, when the user enters an instruction to change part of the settings (for example, change in the diameter of the suction pad, or the like), the selection control unit 175 determines that there is a problem (NO in step S7), and returns to step S1 to urge the user to correction input of the workpiece information. On the other hand, when the user satisfies all the settings, such as suction pad setting D1, workpiece physical model setting D2, and robot setting D3, while referring to the confirmation screen G5, the user gives an instruction of completion of pre-processing by clicking on an OK button or the like. When a command to instruct the completion of the pre-processing is input, the selection control unit 175 determines there is no problem (YES in step S7), and ends the pre-processing described above.

2-2. Second Functional Configuration (in a Case where the Input of the Workpiece Information is Simplified by Using the Workpiece Information Database)

Figure 23:
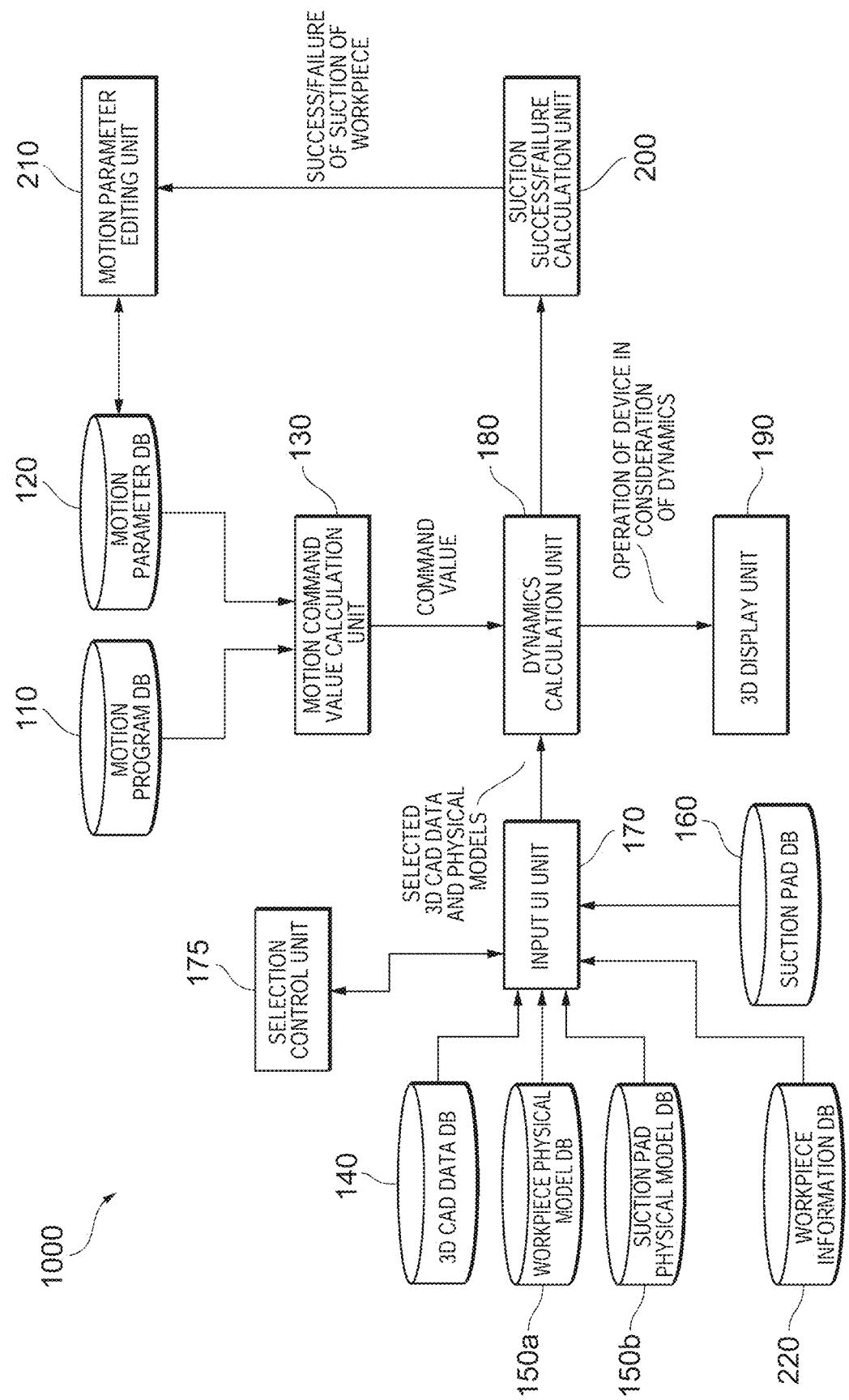
FIG. 23 is a block diagram illustrating a second functional configuration related to the simulation device.

Here, FIG. 23 is a block diagram illustrating a second functional configuration related to the simulation device

1000. The above-described first functional configuration illustrated in FIG. 2 is such that the user enters the workpiece information manually. The second functional configuration illustrated in FIG. 23 is different in that input of the workpiece information is simplified by using a workpiece information DB (workpiece storage unit) 220. In FIG. 23, the same reference numerals are given to components corresponding to those in FIG. 2 described above to omit the detailed description thereof.

FIG. 24 is a diagram illustrating the registered content of the workpiece information DB 220.

As illustrated in FIG. 24, an ID unique to each workpiece and workpiece information (hereinafter called "automatic input workpiece information") automatically input through the input UI unit 170 are registered in a workpiece information DB 220 in association with each other. In information for retrieval (retrieval information), for example, universal product code, name, image picture, kind of product, manufacturer name, and the like are included, while in the automatic input workpiece information, information related to each workpiece entered by the user manually in the first functional configuration (see FIG. 6), which represents, for example, the variation in workpiece height, the allowance of a suction mark, the contents of the workpiece, whether the contents of the workpiece are food, and the like, is included.

2-2-1. Pre-Preparation Processing

FIG. 25 is a flowchart illustrating pre-preparation processing by the simulation device 1000. In the pre-preparation processing illustrated in FIG. 25, steps corresponding to those in FIG. 9 described above are given the same reference numerals to omit detailed description thereof.

The user selects, through the input UI unit 170, a target workpiece to be conveyed. For example, the user can perform a click operation on an image picture of a desired workpiece or the like according to an input screen G6 as illustrated in FIG. 26 to select the target workpiece. When receiving selection information of the target workpiece through the input UI unit 170 (step S11), the selection control unit (acquisition unit) 175 acquires, from the workpiece information DB 220, the automatic input workpiece information corresponding to the target workpiece, that is, information representing the variation in workpiece height, the allowance of a suction mark on the workpiece, the roughness of the workpiece surface, the mass of the workpiece, the air resistance of the workpiece, the size of the suction part of the workpiece, the contents of the workpiece, whether the contents of the workpiece are food, and the like (step S12). On the other hand, the user enters, through the input UI unit 170, workpiece information (hereinafter called "manual input workpiece information") on the atmospheric pressure, the suction pressure, the vibration tolerance during transportation, and the vibration tolerance upon placement. When receiving the manual input workpiece information through the input UI unit 170 (step S13), the selection control unit 175 reflects, on a workpiece information input screen G1' as illustrated in FIG. 27, the automatic input workpiece information acquired from the workpiece information DB 220 and the manual input workpiece information received through the input UI unit 170. After that, the selection control unit 175 uses the automatic input workpiece information, the manual input workpiece information, the suction pad DB 160, and the like to execute the automatic selection process of a suction pad, and the like. Since the automatic selection process of the suction pad (step S2) and subsequent processes can be described in the same way as those in the pre-preparation processing illustrated in FIG. 9 described above, the description thereof is omitted.

Thus, since the workpiece information DB 220 in which the information for retrieval and the automatic input workpiece information are associated with each other is used, the user can enter workpiece information necessary to perform the simulation with such a simple operation as to select the product name of the workpiece or the like without knowing detailed information of the workpiece.

B. Others

<Variation 1>

Figure 28:
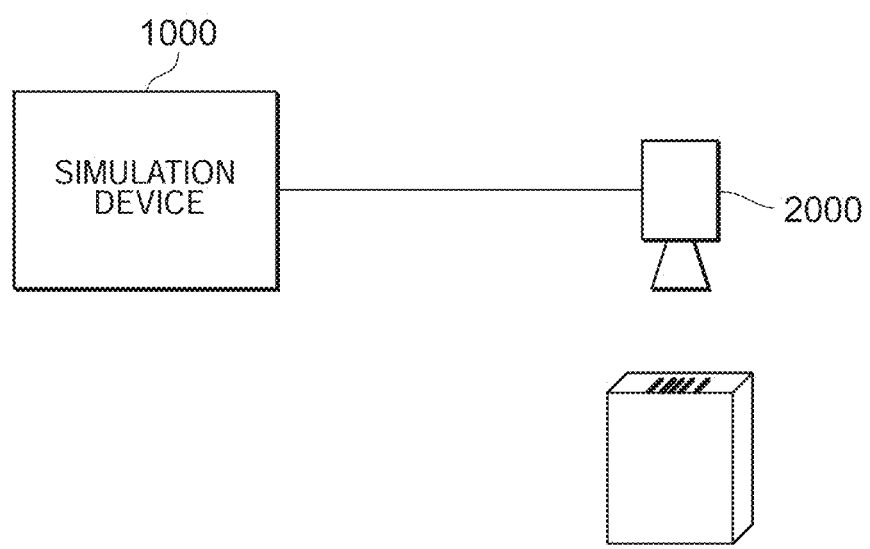
FIG. 28 is a diagram illustrating a system configuration according to Variation 1.
Figure 29:
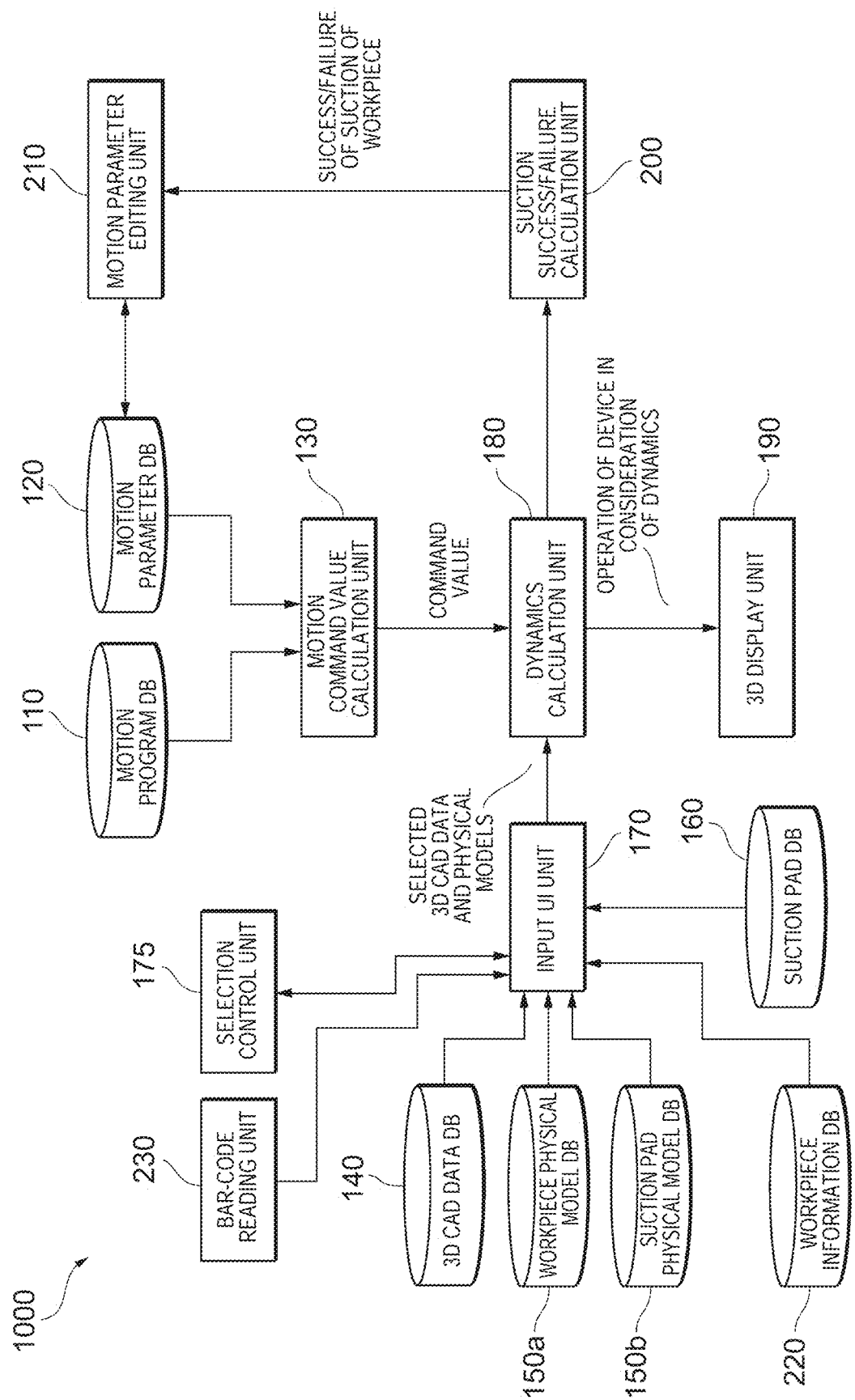
FIG. 29 is a block diagram illustrating the functional configuration of the simulation device.

A bar-code reader for reading workpiece information of a target workpiece may be used to simplify the input of workpiece information. FIG. 28 is a diagram illustrating a system configuration using a bar-code reader 2000 and a simulation device 1000 according to Variation 1, and FIG. 29 is a block diagram illustrating the functional configuration of the simulation device 1000. Since the configuration in FIG. 29 is the same as the configuration illustrated in FIG. 23 described above except that a barcode reading unit 230 is provided, corresponding sections are given the same reference numerals to omit detailed description thereof.

The barcode reading unit 230 reads, for example, the universal product code of a target workpiece from barcode information of the target workpiece acquired by the bar-code reader 2000. Note that information read from the barcode information is not limited to the universal product code, and various pieces of information capable of identifying the target workpiece such as the product name can be adopted.

Figure 30:
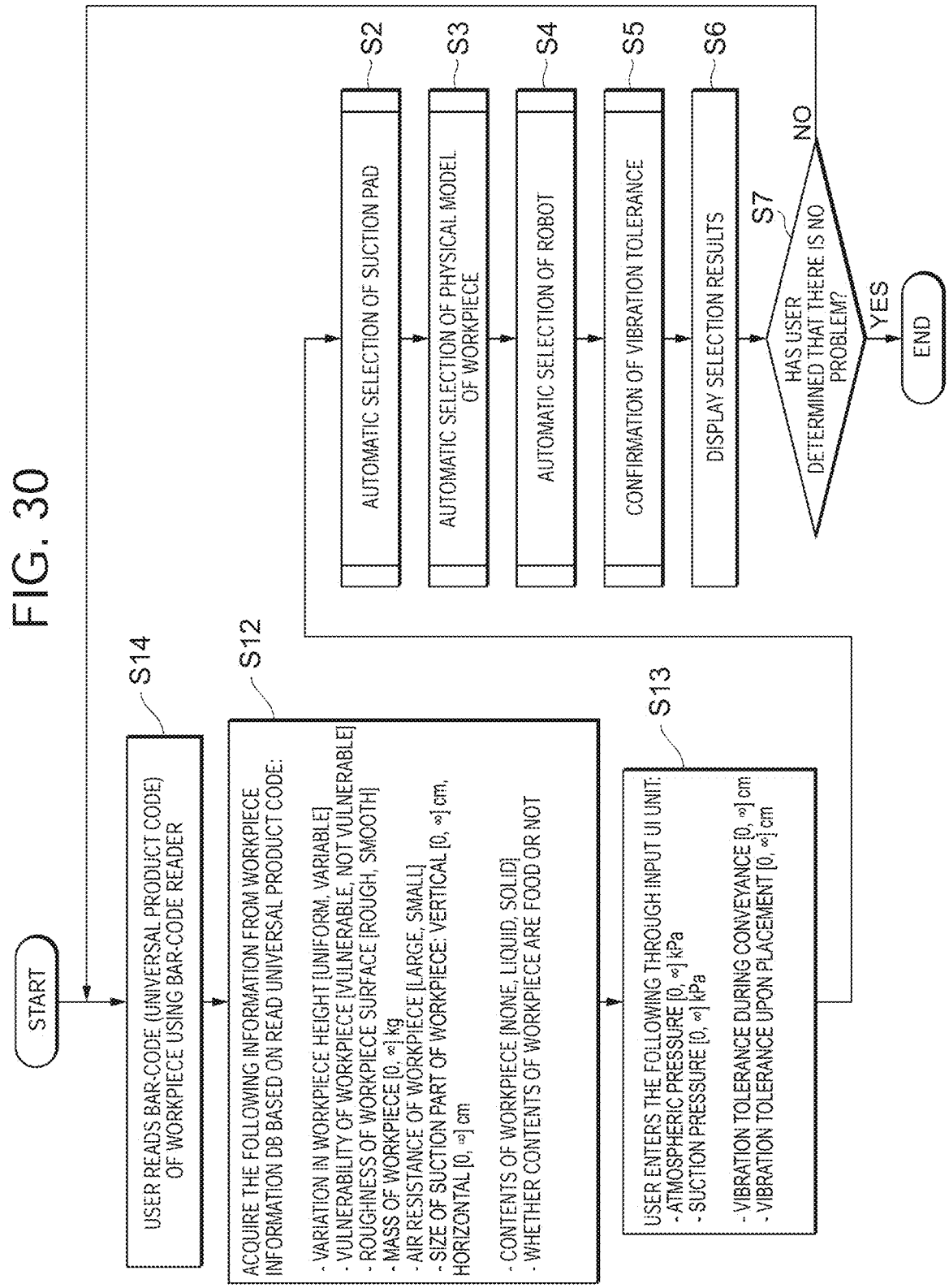
FIG. 30 is a flowchart illustrating pre-preparation processing by the simulation device.

FIG. 30 is a flowchart illustrating pre-preparation processing by the simulation device 1000. In the pre-preparation processing illustrated in FIG. 30, steps corresponding to those in FIG. 25 described above are given the same reference numerals to omit detailed description thereof.

The user scans a barcode of the target workpiece using the bar-code reader 2000. According to this operation, the bar-code reader 2000 acquires the barcode information of the target workpiece and sends the barcode information to the simulation device 1000. The barcode reading unit 230 of the simulation device 1000 reads the universal product code of the target workpiece from the received barcode information (step S14), and outputs the universal product code to the selection control unit 175. The selection control unit 175 uses the universal product code as a search key to search the workpiece information DB 220 to acquire automatic input workpiece information corresponding to the target workpiece (step S12). Since the subsequent processes that follow can be described in the same way as those in the pre-preparation processing illustrated in FIG. 25 described above, the description thereof is omitted.

<Variation 2>

Figure 31:
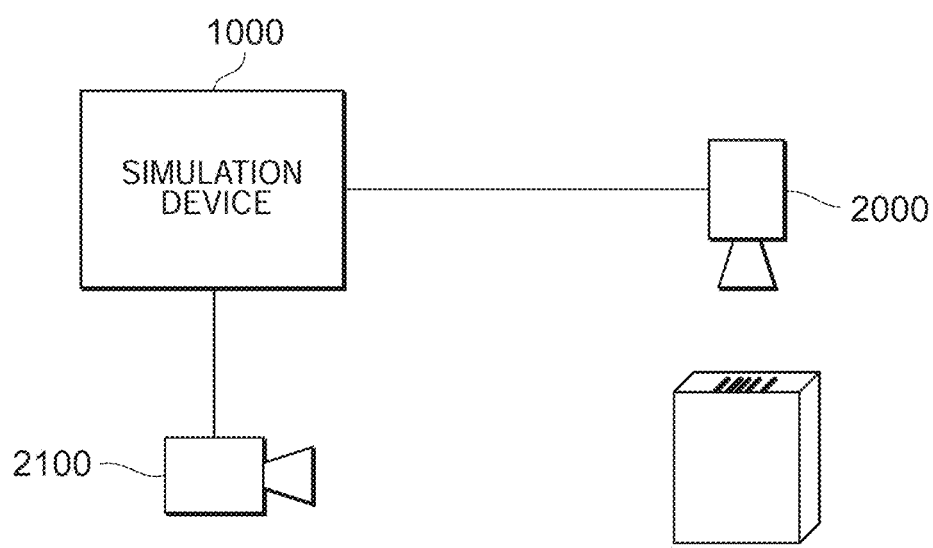
FIG. 31 is a diagram illustrating a system configuration according to Variation 2.
Figure 32:
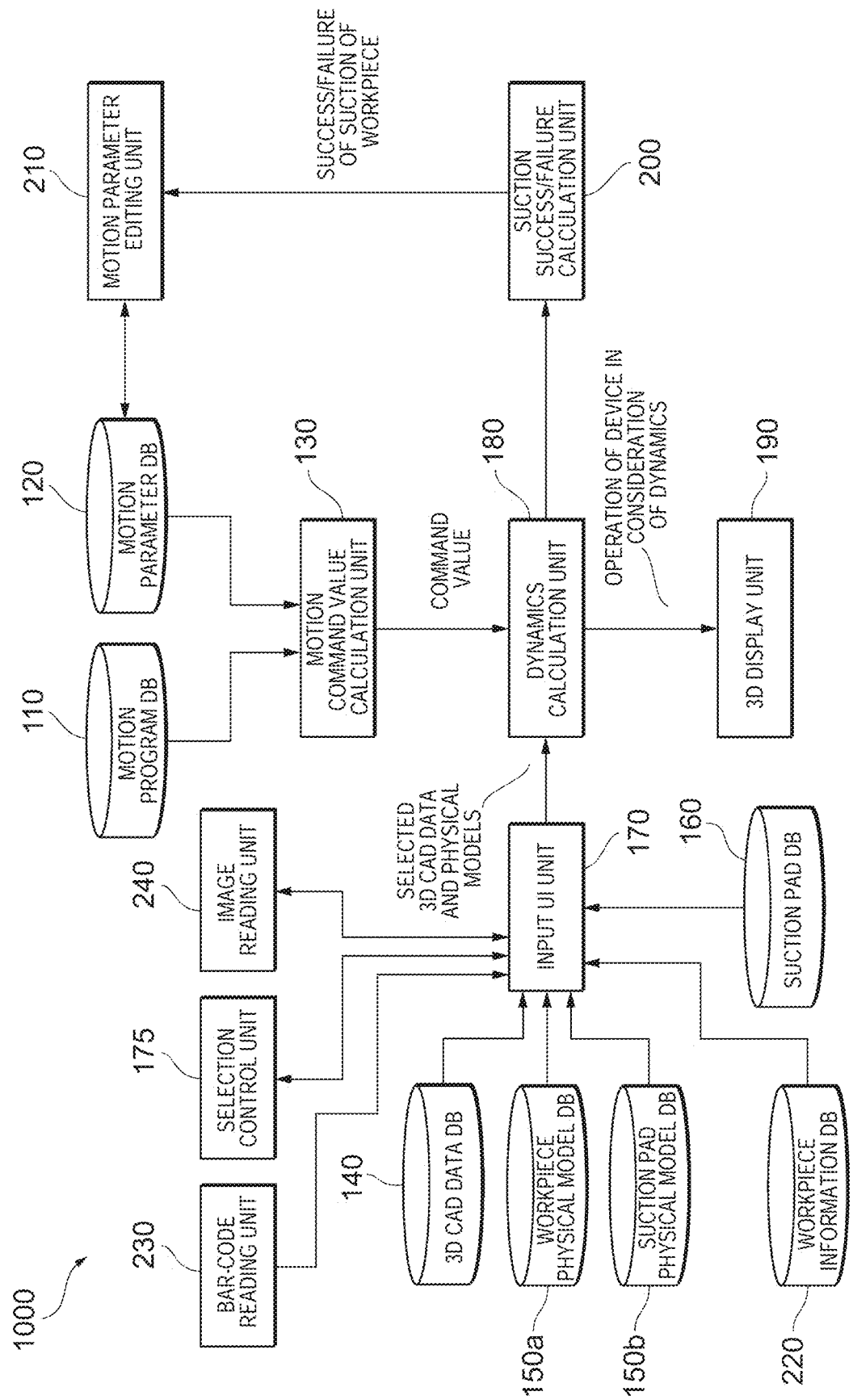
FIG. 32 is a block diagram illustrating the functional configuration of the simulation device.

An image sensor for taking an image of a target workpiece may also be used to correct the suction position of a workpiece pad appropriately, and the like. FIG. 31 is a diagram illustrating a system configuration using the bar-code reader 2000, an image sensor 2100, and a simulation device 1000 according to Variation 2, and FIG. 32 is a block diagram illustrating the functional configuration of the simulation device 1000. Since the configuration in FIG. 32 is the same as the configuration illustrated in FIG. 29 described above except that an image reading unit 240 is provided, corresponding sections are given the same reference numerals to omit detailed description thereof.

The image reading unit 240 reads image data of a target workpiece captured and generated by the image sensor 2100, and outputs the image data to the selection control unit 175.

Figure 33:
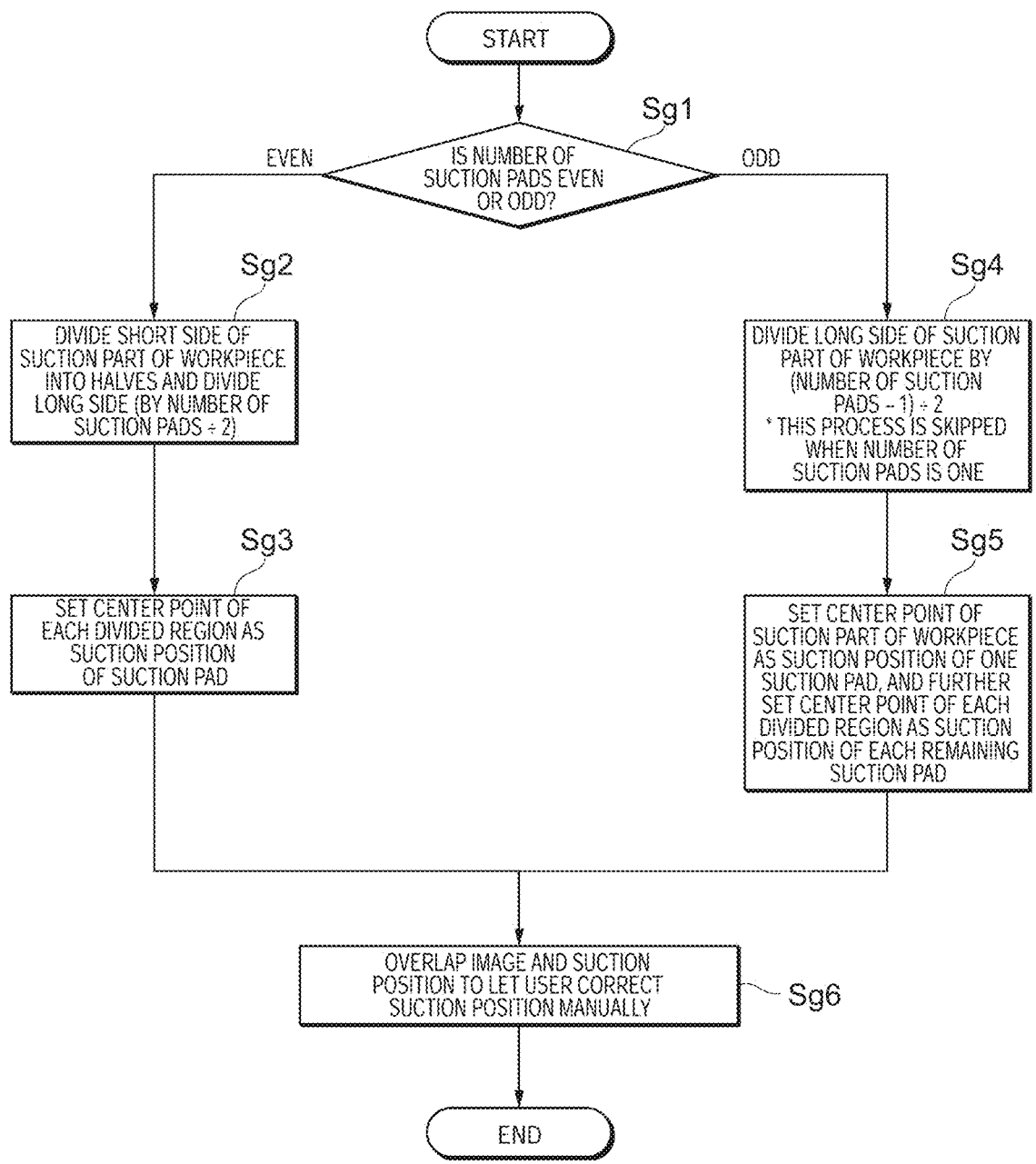
FIG. 33 is a flowchart illustrating a process of deciding on the suction position of a suction pad.

FIG. 33 is a flowchart illustrating a process of deciding on the suction position of a suction pad, which is the same as that in FIG. 16 described above except that a step in which the user manually corrects the suction position (see step Sg6) is provided. Therefore, steps corresponding to those in FIG. 16 described above are given the same reference numerals to omit detailed description thereof.

When automatically deciding on the suction position of the suction pad (step Sg3, step Sg5), the selection control unit 175 proceeds to step Sg6 to correct the suction position of the suction pad according to an instruction from the user, and ends the process.

Figure 34:
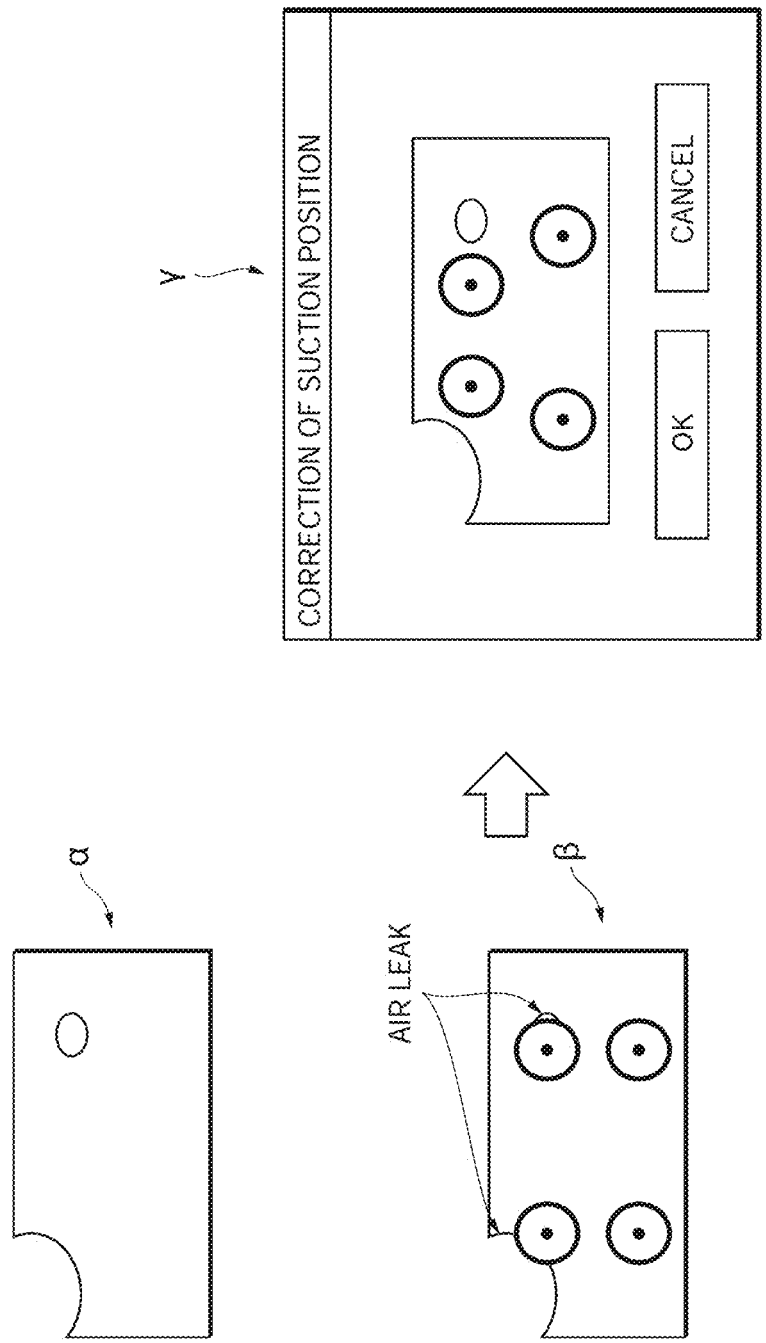
FIG. 34 is a flowchart illustrating correction processing for the suction position of a suction pad.

Here, FIG. 34 is a diagram for describing correction processing for the suction position of a suction pad.

A target workpiece illustrated at a in FIG. 34 is an iron plate, which is not rectangular and has a hole on the right side (hereinafter called the "odd-shaped iron plate"). When the odd-shaped iron plate is set as the target workpiece, the suction position of a corresponding suction pad automatically decided may overlap with the hole of the odd-shaped iron plate or the like (see 13 in FIG. 34), and hence the suction may fail due to air leak from the hole or the like. Therefore, in this Variation, the selection control unit 175 generates an image of the target workpiece based on the image data of the target workpiece read by the image reading unit 240, and superimposes and displays, on the display unit, the generated image of the target workpiece and the suction position of the suction pad upon each other (see y in FIG. 34). The user checks the image of the target workpiece with the suction position of the suction pad displayed on the display unit to correct (move) the suction position of the suction pad to a position, at which no air leak can occur, with a drag-and-drop operation or the like. When receiving a correction instruction for the suction position from the user through the input UI unit (correction input unit) 170, the selection control unit (correction unit) 175 corrects the suction position of the suction pad according to the correction instruction.

Thus, since the image sensor for capturing the target workpiece is used, the suction position of the suction pad can be corrected to an appropriate position even on an odd-shaped target workpiece or the like.

<Variation 3>

Figure 35:
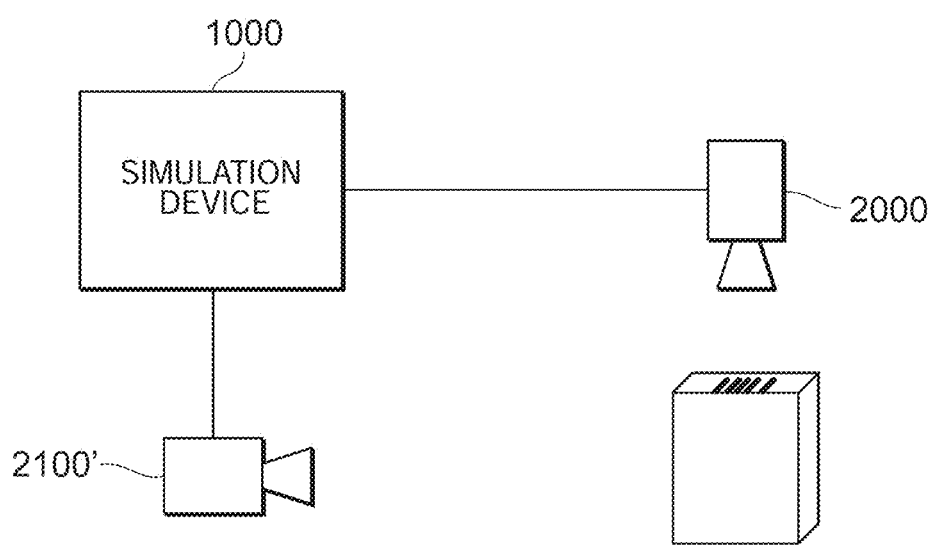
FIG. 35 is a diagram illustrating a system configuration according to Variation 3.
Figure 36:
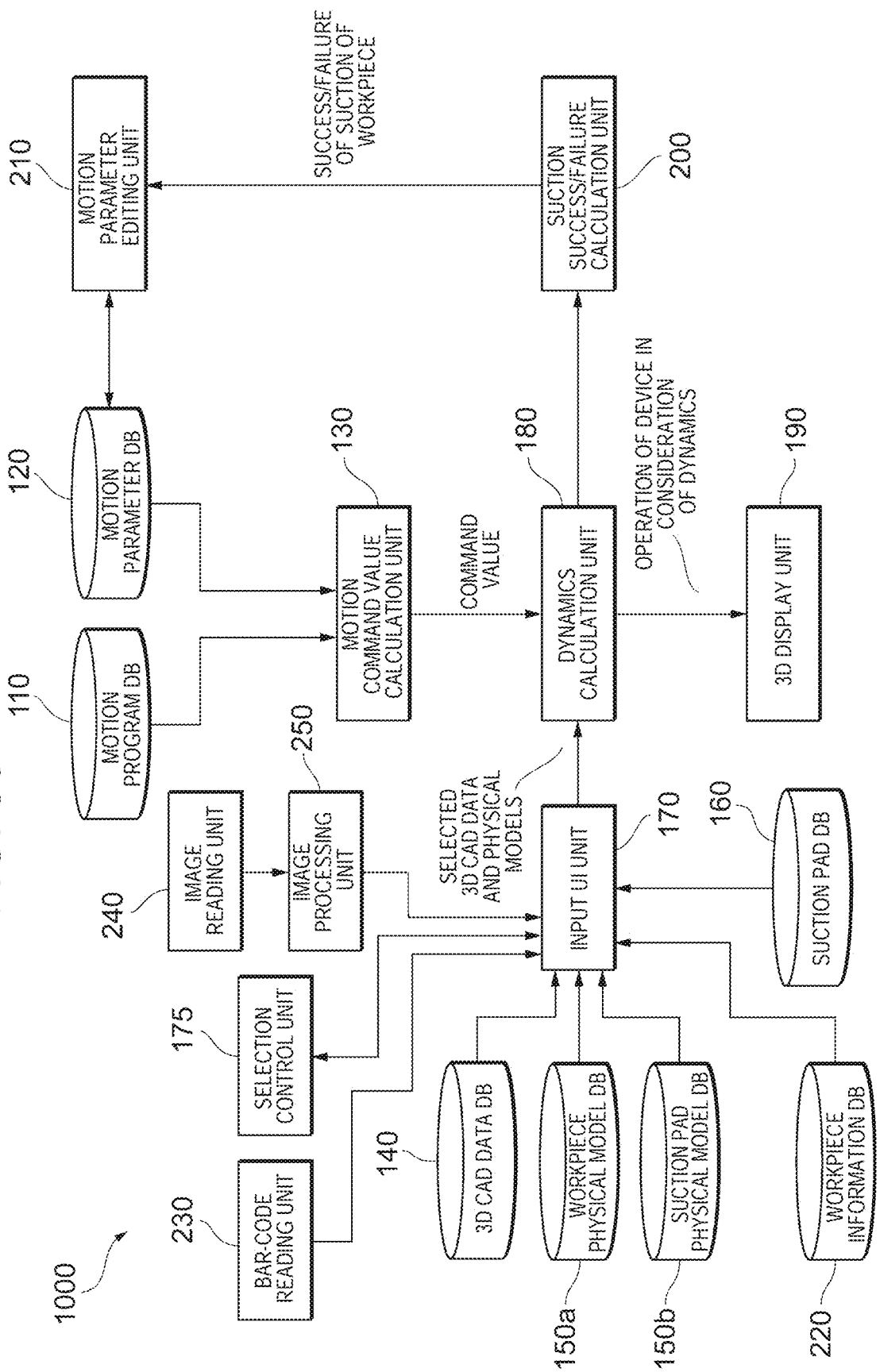
FIG. 36 is a block diagram illustrating the functional configuration of the simulation device.

A 3D image sensor may be used to further simplify the input of workpiece information and the like. FIG. 35 is a diagram illustrating a system configuration using the barcode reader 2000, a 3D image sensor 2100', and a simulation device 1000 according to Variation 3, and FIG. 36 is a block diagram illustrating the functional configuration of the simulation device 1000. Since the configuration in FIG. 36 is the same as the configuration illustrated in FIG. 32 described above except that an image processing unit 250 is provided, corresponding sections are given the same reference numerals to omit detailed description thereof.

The image reading unit 240 reads image data of a target workpiece captured and generated by the 3D image sensor 2100', and outputs the image data to the image processing unit 250.

The image processing unit 250 analyzes the image data output from the image reading unit 240, or the like to generate several pieces of workpiece information. As described by taking an example, the image processing unit 250 performs image processing on the image data of the target workpiece captured and generated by the 3D image sensor 2100' to calculate the variation in workpiece height, the roughness of the workpiece surface, the size of the suction part of the workpiece automatically in order to reflect the calculation results on an input screen G7 as illustrated in FIG. 37, for example. Note that the workpiece information generated by the image processing unit 250 is not limited to the variation in workpiece height, the roughness of the workpiece surface, and the size of the suction part of the workpiece, and it is possible to appropriately set what kind of workpiece information is generated according to an image processing program or the like. Further, a combination of a 2D image sensor and a displacement sensor may be used instead of the 3D image sensor.

<Variation 4>

In the embodiment and Variations described above, the description is made mainly on the pre-preparation processing for the simulation of the suction of the workpiece. However, as a result of the simulation, the user may determine to change the suction pad and the like. Therefore, in this Variation, the suction pad, the workpiece physical model, the robot, and the like selected upon simulation is displayed after the simulation is performed so that the user can correct the selection results manually.

Figure 38:
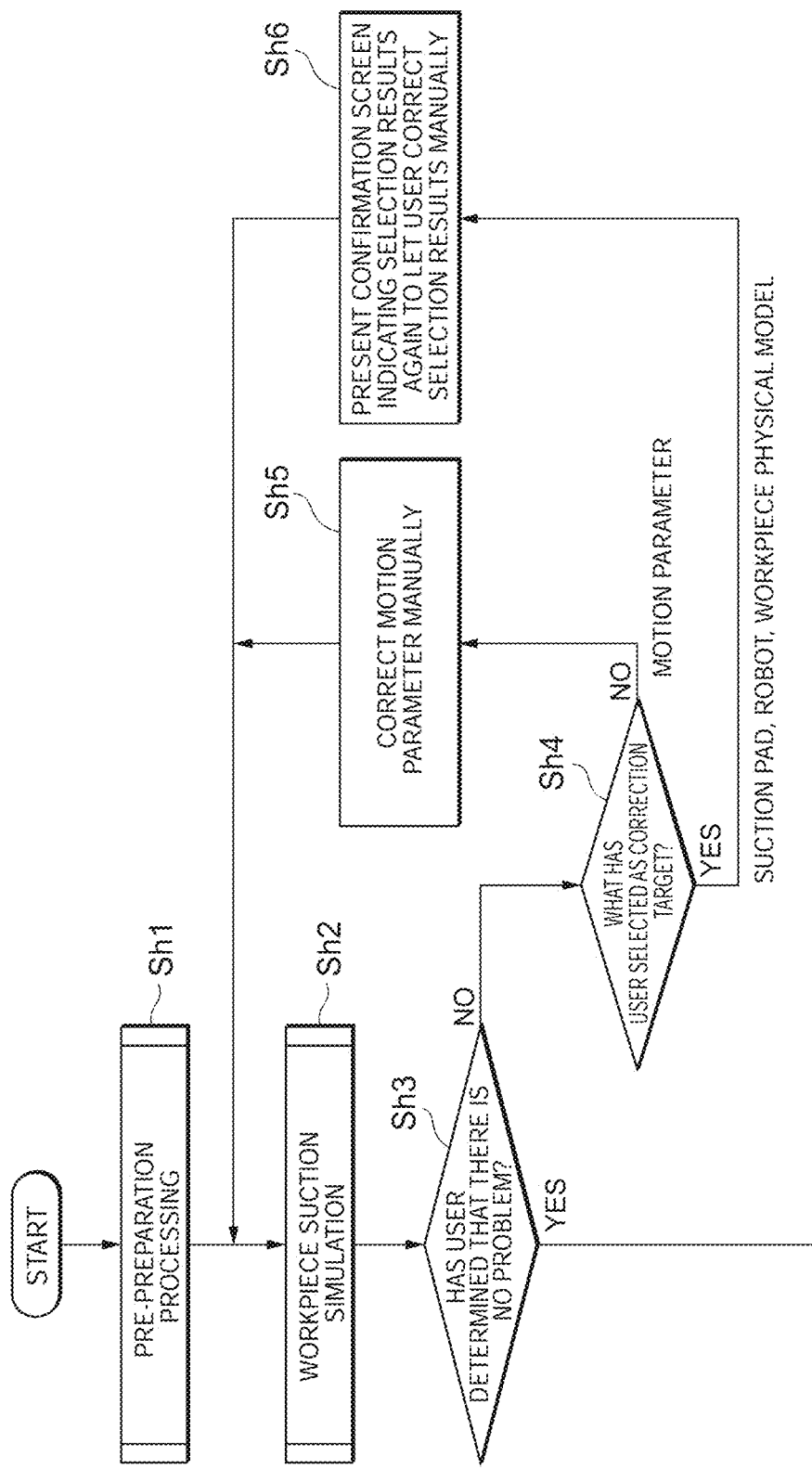
FIG. 38 is a flowchart illustrating a correction process of the selection results according to Variation 4.

FIG. 38 is a flowchart illustrating a correction process of the selection results according to Variation 4.

When the pre-preparation processing (the automatic selection process of the suction pad, the automatic selection process of the workpiece physical model, the automatic selection process of the robot, and the like) is performed (step Sh1), the simulation device 1000 performs the simulation of the suction of the workpiece suction simulation (step Sh2). Then, the simulation device 1000 displays a simulation image on the display unit or the like to let the user recognize the simulation results and the like.

When the user determines that there is no problem with the simulation results for the reasons that the suction of the workpiece is successful and the like (YES in step Sh3), the user operates operation buttons and the like to enter an end instruction. On the other hand, when the user determines that there is a problem with the simulation results for the reason that the suction of the workpiece is unsuccessful (NO in step Sh3), the user operates the operation buttons and the like to select correction target items. To be more specific, a selection screen representing (1) whether to select motion parameters and (2) whether to select the suction pad, the workpiece physical model, and the robot automatically selected in the pre-preparation processing are displayed as the correction target items on the display unit of the simulation device 1000. When selecting the motion parameters (step Sh4→step Sh5), the user manually corrects the motion parameters composed of the target position (motion path) of the holding unit of the pick-and-place device, the maximum speed, the maximum acceleration, the maximum deceleration, and the like. The motion parameter editing unit 210 corrects the motion parameters registered in the motion parameter DB 120 according to correction instructions from the user, and then returns to step Sh2. When returning to step Sh2, the simulation device 1000 performs the simulation of the suction of the workpiece again using the corrected motion parameters.

On the other hand, when the user selects, as the correction target items, the suction pad, the workpiece physical model, and the robot automatically selected in the pre-preparation processing (step Sh4→step Sh6), the confirmation screen G5 for indicating the selection results as illustrated in FIG. 22 described above is displayed again on the display unit or the like. The user corrects at least any one (or more) of the suction pad, the workpiece physical model, and the robot while checking the selection results on the confirmation screen G5. For example, in the case of the suction pad, the user corrects the shape of the suction pad shape and/or the number of suction pads appropriately by manipulating the mouse and the like. The selection control unit 175 corrects at least any one (or more) of the suction pad, the workpiece physical model, and the robot according to the correction instructions from the user, and then returns to step Sh2. When returning to step Sh2, the simulation device 1000 performs the simulation of the suction of the workpiece again using the corrected motion parameters.

When determining that there is no problem with the simulation results for the reason that the suction of the workpiece is successful while the above-described processing is being repeatedly performed, the user uses the mouse and the like to enter that there is no problem. When such an input operation is performed, the simulation device 1000 ends the correction process of the selection results described above.

Thus, since the motion parameters or the selection results, such as the suction pad, the workpiece physical model, and the robot, are corrected based on the actual simulation results of the suction of the workpiece, the optimum simulation can be performed.

In Variation 4 mentioned above, the user manually corrects the motion parameters (step Sh5) or the selection results (step Sh6), but the simulation device 1000 may correct the motion parameters or the selection results automatically instead of (or in addition to) the fact that the user manually corrects the motion parameters or the selection results.

<Variation 5>

In the embodiment and Variations described above, the description is made on the case where the suction pad and the like are automatically selected based on the workpiece information entered by the user. However, there is a case where the user has a suction pad that the user wants to evaluate beforehand, or the like. Therefore, in this Variation, the user specifies information related to the suction pad that the user wants to evaluate beforehand (manufacturer name, model code, and the like; hereinafter called "pad information") to perform a simulation.

Figure 39:
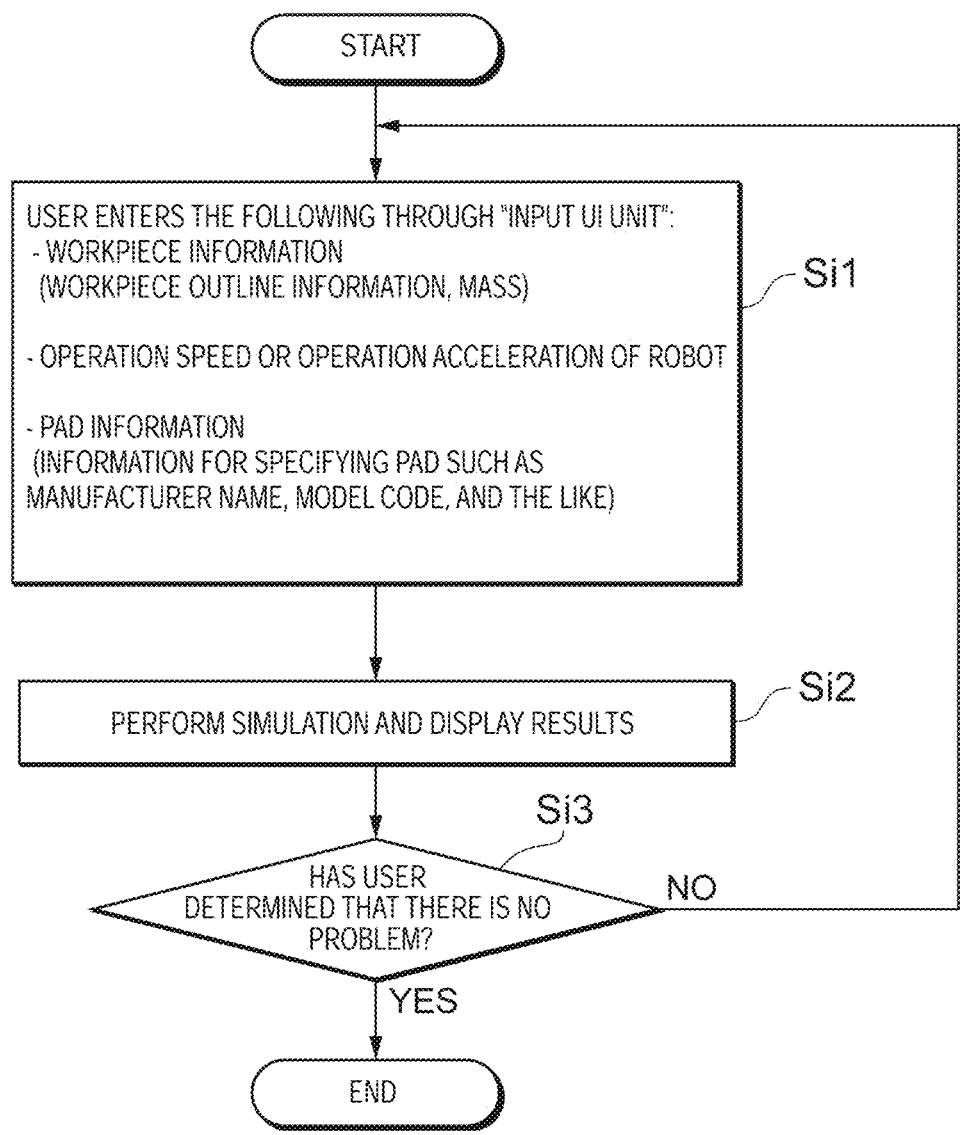
FIG. 39 is a flowchart illustrating simulation processing according to Variation 5.

FIG. 39 is a flowchart illustrating simulation processing according to Variation 5.

The user operates the operation buttons and the like properly to enter the motion parameters, such as the robot operating speed (or operating acceleration), and further pad information as well as the workpiece information (for example, workpiece outline information, the mass of the workpiece, and the like). When receiving the workpiece information, the robot motion parameters, and the pad information through the input UI unit (first input unit, second input unit, third input unit) 170 (step Si1), the simulation device 1000 performs the simulation of the suction of the workpiece (step Si2).

Specifically, the suction success/failure calculation unit (determination unit, output unit) 200 of the simulation device 1000 determines, based on the device operation in consideration of dynamics supplied from the dynamics calculation unit 180, the success or failure of the suction of the workpiece by the suction pad based on the input pad information, displays the determination result information representing the determination result on the display unit or the like, and informs the user of the simulation results.

When the user determines that there is a problem with the simulation results for the reason that the suction of the workpiece is unsuccessful (NO in step Si3), the processing returns to step Si1 in which the user operates the operation buttons and the like to enter resetting instructions of the workpiece information, the robot motion parameters, the pad information, and the like. On the other hand, when the user determines that there is no problem with the simulation results for the reason that the suction of the workpiece is successful or the like (YES in step Si3), the user operates the operation buttons and the like to enter an end instruction in order to end the processing.

Thus, the suction pad or the like that the user wants to evaluate may be targeted for performing the simulation. Further, the configuration of Variation 4 can also be combined appropriately with the configuration of the embodiment and Variations described above. Specifically, the mode in which the user selects the suction pad or the like, and the mode in which the suction pad or the like is automatically selected by the simulation device 1000 may be switched according to a user's button operation or the like.

<Variation 6>

In the embodiment and Variations described above, the pick-and-place device using a suction pad is targeted for simulation, but a chuck having plural claws for workpiece holding may be used instead of the suction pad.

The simulation technology according to the embodiment and Variations described above can be applied to a wide variety of fields. For example, the simulation technology can be applied to various pick-and-place devices used in various industrial fields such as food, machinery parts, chemical products, and drugs, the fisheries sector, the agricultural sector, the forestry field, service industries, and medical and health fields. Further, the simulation technology is not limited to application to the pick-and-place devices, and it is applicable to all kinds of devices for holding workpieces, such as assembling equipment for assembling workpieces after conveying the workpieces to a predetermined position while holding the workpieces with arms.

In this specification, the term "unit" does not merely mean a physical component, and includes a case where the function of the "unit" is implemented by software. Further, the function of one "unit" may be implemented by two or more physical components or devices, and the functions of two or more "units" or devices may be implemented by one physical means or device.

(Supplementary Note 1)

A device for outputting holding detection results including at least one hardware processor, and a first memory for storing plural pieces of holding member information related to a holding member for a workpiece installed in a robot, wherein the hardware processor accepts workpiece information including outline information and mass information of a workpiece, simulates whether the workpiece can be held by the holding member or not based on the workpiece information, selects, as a holding member candidate, the holding member determined to be able to hold the workpiece as a result of the simulation, and outputs the holding member information of the selected holding member candidate.

(Supplementary Note 2)

A device for outputting holding detection results including: at least one hardware processor; a workpiece memory for storing retrieval information and workpiece information in association with each other for each workpiece; and a first memory for storing plural pieces of holding member information related to a holding member for the workpiece installed in a robot, wherein the hardware processor accepts input of the retrieval information of any of workpieces, searches the workpiece memory using the input retrieval information of the workpiece as a key to acquire workpiece information corresponding to the input workpiece, simulates whether the workpiece can be held by the holding member or not based on the acquired workpiece information, selects, as a holding member candidate, the holding member determined to be able to hold the workpiece as a result of the simulation, and outputs the holding member information of the selected holding member candidate.

(Supplementary Note 3)

A device for outputting holding detection results including at least one hardware processor, wherein the hardware processor accepts workpiece information including outline information and mass information of a workpiece, accepts input of an operating speed or operating acceleration of a robot, accepts input of holding member information related to a holding member for the workpiece installed in the robot, simulates whether the workpiece can be held by the holding member or not based on the workpiece information, and outputs the simulation results.

What is claimed is:

1. A device for outputting holding detection results comprising a processor configured with a program to perform operations comprising:
    operation as an input unit for accepting workpiece information including outline information and mass information of a workpiece;
    operation as a first storage unit for storing plural pieces of holding member information related to a holding member for the workpiece installed in a robot;
    operation as a first selection unit for simulating whether the workpiece can be held by the holding member or not based on the workpiece information accepted at the input unit, and selecting, as a holding member candidate, the holding member determined to be able to hold the workpiece as a result of the simulation;
    operation as a determination unit configured to determine whether the holding member candidate is capable of holding the workpiece when the robot moves according to a motion control program;
    operation as a motion parameter editing unit configured to edit parameters of the motion control program, in response to the determination unit determining that the holding member candidate is not capable of holding the workpiece when the robot moves according to the motion control program; and
    operation as an output unit for outputting the holding member information of the holding member candidate selected by the first selection unit, wherein
    the processor is configured with the program to perform operations:
    such that operation as the input unit comprises accepting a vibration tolerance value of the workpiece, and
    further comprising operation as a display unit for displaying a state where the workpiece vibrates according to the vibration tolerance value of the workpiece.

2. The device for outputting holding detection results according to claim 1, wherein the holding member is a suction pad, and the holding member candidate is a suction pad candidate.

3. The device for outputting holding detection results according to claim 2, wherein the holding member information of the suction pad candidate includes at least any of shape, material, and diameter of the suction pad, the number of suction pads, and a suction position of the suction pad relative to the workpiece.

4. The device for outputting holding detection results according to claim 2, wherein the holding member information of the suction pad candidate further includes either a manufacturer of the suction pad or a manufacturer's model code.

5. The device for outputting holding detection results according to claim 2, wherein
    the holding member information of the suction pad candidate includes placement of the suction pad relative to the workpiece,
    the processor is configured with the program to perform operations:
        such that operation as the output unit comprises superimposing an image representing the placement of the suction pad on an image representing the workpiece and displays the superimposed image on the display unit, and
        further comprising operation as a correction input unit for accepting a correction instruction on the placement of the suction pad displayed on the display unit, and a correction unit for correcting the placement of the suction pad according to the correction instruction.

6. The device for outputting holding detection results according to claim 1, wherein the outline information of the workpiece includes at least either a variation in workpiece height or allowance of a suction mark on the workpiece.

7. The device for outputting holding detection results according to claim 1, wherein the outline information of the workpiece is roughness of the workpiece surface.

8. The device for outputting holding detection results according to claim 1, wherein the processor is configured with the program to perform operations further comprising:
    operation as a second storage unit for storing plural pieces of robot information related to the robot; and
    operation as a second selection unit for selecting, as a robot candidate, robot information of the robot for holding the workpiece from among plural pieces of the robot information based on the workpiece information.

9. A device for outputting holding detection results comprising a processor configured with a program to perform operations comprising:
    operation as a workpiece storage unit for storing retrieval information and workpiece information in association with each other for each workpiece;
    operation as a first storage unit for storing plural pieces of holding member information related to a holding member for the workpiece installed in a robot;
    operation as an input unit for accepting input of the retrieval information of any of workpieces;
    operation as an acquisition unit for searching the workpiece storage unit using the input retrieval information of the workpiece as a key to acquire workpiece information corresponding to the input workpiece;
    operation as a first selection unit for simulating whether the workpiece can be held by the holding member or not based on the acquired workpiece information, and selecting, as a holding member candidate, the holding member determined to be able to hold the workpiece as a result of the simulation;
    operation as a determination unit configured to determine whether the holding member candidate is capable of holding the workpiece when the robot moves according to a motion control program;
    operation as a motion parameter editing unit configured to edit parameters of the motion control program, in response to the determination unit determining that the holding member candidate is not capable of holding the workpiece when the robot moves according to the motion control program; and operation as an output unit for outputting the holding member information of the holding member candidate selected by the first selection unit, wherein the processor is configured with the program to perform operations:

such that operation as the input unit comprises accepting a vibration tolerance value of the workpiece, and further comprising operation as a display unit for displaying a state where the workpiece vibrates according to the vibration tolerance value of the workpiece.

10. The device for outputting holding detection results according to claim 9, wherein the retrieval information includes barcode information, the device further comprises a barcode reading unit for reading barcode information of the workpiece, the processor is configured with the program to perform operations such that:

operation as the input unit comprises inputting, as the retrieval information, the barcode information of the workpiece read by the barcode reading unit, and operation as the acquisition unit comprises searching the workpiece storage unit using the input barcode information of the workpiece as a key to acquire workpiece information corresponding to the input workpiece.

11. A device for outputting holding detection results comprising a processor configured with a program to perform operations comprising:

operation as a first input unit for accepting workpiece information including outline information and mass information of a workpiece;

operation as a second input unit for accepting input of an operating speed or operating acceleration of a robot;

operation as a third input unit for accepting input of holding member information related to a holding member for the workpiece installed in the robot;

operation as an output unit for simulating whether the workpiece can be held by the holding member or not based on the workpiece information accepted at the first input unit, the operating speed or the operating acceleration of the robot accepted at the second input unit, and the holding member information related to the holding member for the workpiece accepted at the third input unit, and outputting simulation results, operation as a determination unit configured to determine, based on the simulation results, whether the holding member is capable of holding the workpiece when the robot moves according to a motion control program;

operation as a motion parameter editing unit configured to edit parameters of the motion control program, in response to the determination unit determining that the holding member is not capable of holding the workpiece when the robot moves according to the motion control program; wherein the processor is configured with the program to perform operations:

such that operation as the first input unit comprises accepting a vibration tolerance value of the workpiece, and further comprising operation as a display unit for displaying a state where the workpiece vibrates according to the vibration tolerance value of the workpiece.

* * * * *